United States Patent
Saito et al.

(10) Patent No.: US 9,213,617 B2
(45) Date of Patent: Dec. 15, 2015

(54) ERROR RESPONSE CIRCUIT, SEMICONDUCTOR INTEGRATED CIRCUIT, AND DATA TRANSFER CONTROL METHOD

(71) Applicant: FUJITSU SEMICONDUCTOR LIMITED, Yokohama-shi, Kanagawa (JP)

(72) Inventors: Natsumi Saito, Kawasaki (JP); Eiichi Nimoda, Hachioji (JP)

(73) Assignee: SOCIONEXT INC., Yokohama (JP)

( * ) Notice: Subject to any disclaimer, the term of this patent is extended or adjusted under 35 U.S.C. 154(b) by 157 days.

(21) Appl. No.: 13/785,123

(22) Filed: Mar. 5, 2013

(65) Prior Publication Data

US 2013/0262939 A1 Oct. 3, 2013

(30) Foreign Application Priority Data

Mar. 27, 2012 (JP) ................................ 2012-072059

(51) Int. Cl.
*G06F 11/00* (2006.01)
*G06F 11/30* (2006.01)
*G06F 11/07* (2006.01)

(52) U.S. Cl.
CPC ............ *G06F 11/30* (2013.01); *G06F 11/0745* (2013.01); *G06F 11/0751* (2013.01); *G06F 11/0766* (2013.01); *G06F 11/3041* (2013.01); *G06F 11/3055* (2013.01); *G06F 11/3062* (2013.01)

(58) Field of Classification Search
CPC ............ G06F 11/3058; G06F 11/3062; G06F 11/0751; G06F 11/0754; G06F 11/0772; G06F 11/0784

USPC .......................................................... 714/22
See application file for complete search history.

(56) References Cited

U.S. PATENT DOCUMENTS 5,805,473 A * 9/1998 Hadderman ................... 713/321
5,870,623 A * 2/1999 Shirata ............................. 712/28
(Continued)

FOREIGN PATENT DOCUMENTS

CN 101788972 A 7/2010
CN 101855624 A 10/2010
(Continued)

OTHER PUBLICATIONS

Chinese Office Action for Chinese Application No. 201310090628.0 dated Jun. 3, 2015.
(Continued)

*Primary Examiner* — Joshua Lohn
(74) *Attorney, Agent, or Firm* — Arent Fox LLP

(57) ABSTRACT

In an error response circuit an analysis circuit unit analyzes a command transmitted from a first circuit section to a second circuit section, and detects a status of data transfer between the first circuit section and the second circuit section. A response circuit unit generates an error signal in accordance with the detected status of the data transfer in response to the second circuit section changing from a first power consumption state to a second power consumption state in which power consumption is lower than power consumption in the first power consumption state. A switching circuit unit transmits the error signal to the first circuit section in place of a response signal that is responsive to the command and transmitted from the second circuit section to the first circuit section.

12 Claims, 15 Drawing Sheets

(56) References Cited

U.S. PATENT DOCUMENTS

| | | | |
|---|---|---|---|
| 6,311,237 B1* | 10/2001 | Suzuki et al. | 710/52 |
| 6,351,829 B1* | 2/2002 | Dupont et al. | 714/48 |
| 7,093,167 B2* | 8/2006 | Komiya | 714/44 |
| 7,774,649 B2* | 8/2010 | Neilan | 714/23 |
| 7,937,602 B2* | 5/2011 | Elliott et al. | 713/340 |
| 2002/0054477 A1* | 5/2002 | Coffey et al. | 361/686 |
| 2008/0005377 A1* | 1/2008 | Lambert et al. | 710/15 |
| 2008/0320326 A1* | 12/2008 | Akiyama et al. | 714/5 |
| 2009/0006902 A1* | 1/2009 | Corcoran et al. | 714/48 |
| 2009/0199050 A1 | 8/2009 | Neilan | |
| 2011/0145620 A1* | 6/2011 | Shih et al. | 713/340 |
| 2013/0151891 A1* | 6/2013 | Piry et al. | 714/10 |
| 2013/0232369 A1* | 9/2013 | James | 713/340 |

FOREIGN PATENT DOCUMENTS

| | | |
|---|---|---|
| JP | 2003-288278 A | 10/2003 |
| JP | 2007-172575 A | 7/2007 |

OTHER PUBLICATIONS

Partial Japanese Office Action issued on Sep. 29, 2015; Japanese Application No. 2012-072059.

* cited by examiner

ERROR RESPONSE CIRCUIT, SEMICONDUCTOR INTEGRATED CIRCUIT, AND DATA TRANSFER CONTROL METHOD

CROSS-REFERENCE TO RELATED APPLICATION

This application is based upon and claims the benefit of priority of the prior Japanese Patent Application No. 2012-072059, filed on Mar. 27, 2012, the entire contents of which are incorporated herein by reference.

FIELD

The embodiments discussed herein are related to an error response circuit, a semiconductor integrated circuit, and a data transfer control method.

BACKGROUND

In recent years a further reduction in the power consumption of electronic devices, semiconductor integrated circuits, and the like has been sought. Controlling the supply of power to a circuit section, stopping an operation clock for a circuit, or the like may be adopted as a method for reducing power consumption.

By the way, for example, when data transfer is performed in a semiconductor integrated circuit, a circuit section which is a destination of a transfer command returns a response to the transfer command to a circuit section which is a source of the transfer command. The source circuit section waits until it receives the response. One of standards for such data transfer involving a handshake is AMBA (Advanced Microcontroller Bus Architecture). AMBA is adopted in semiconductor integrated circuits such as SoC (System-on-a-Chip).

Japanese Laid-open Patent Publication No. 2007-172575

However, when the above data transfer is performed and the circuit section which is a destination of the transfer command goes into a low power consumption state, there is a case where the circuit section which is a destination of the transfer command cannot return the response to the circuit section which is a source of the transfer command. For example, if the circuit section which is a destination of the transfer command is put into a low power consumption state during the data transfer or if the transfer command is transmitted from the source circuit section at the time of the circuit section which is a destination of the transfer command being in a low power consumption state, there is a possibility that the source circuit section cannot receive a response signal. In that case, the data transfer is stopped improperly and the circuit section which is a source of the transfer command cannot perform a process eternally. That is to say, the circuit section which is a source of the transfer command may hang up.

SUMMARY

According to an embodiment, an error response circuit includes an analysis circuit unit configured to analyze a command transmitted from a first circuit section to a second circuit section and to detect a status of data transfer between the first circuit section and the second circuit section; a response circuit unit configured to generate an error signal in accordance with the status of the data transfer detected by the analysis circuit unit in response to the second circuit section changing from a first power consumption state to a second power consumption state in which power consumption is lower than power consumption in the first power consumption state; and a switching circuit unit configured to transmit to the first circuit section the error signal generated by the response circuit unit in place of a response signal when the second circuit section is in the second power consumption state, the response signal being responsive to the command and transmitted from the second circuit section to the first circuit section.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Figure 1:
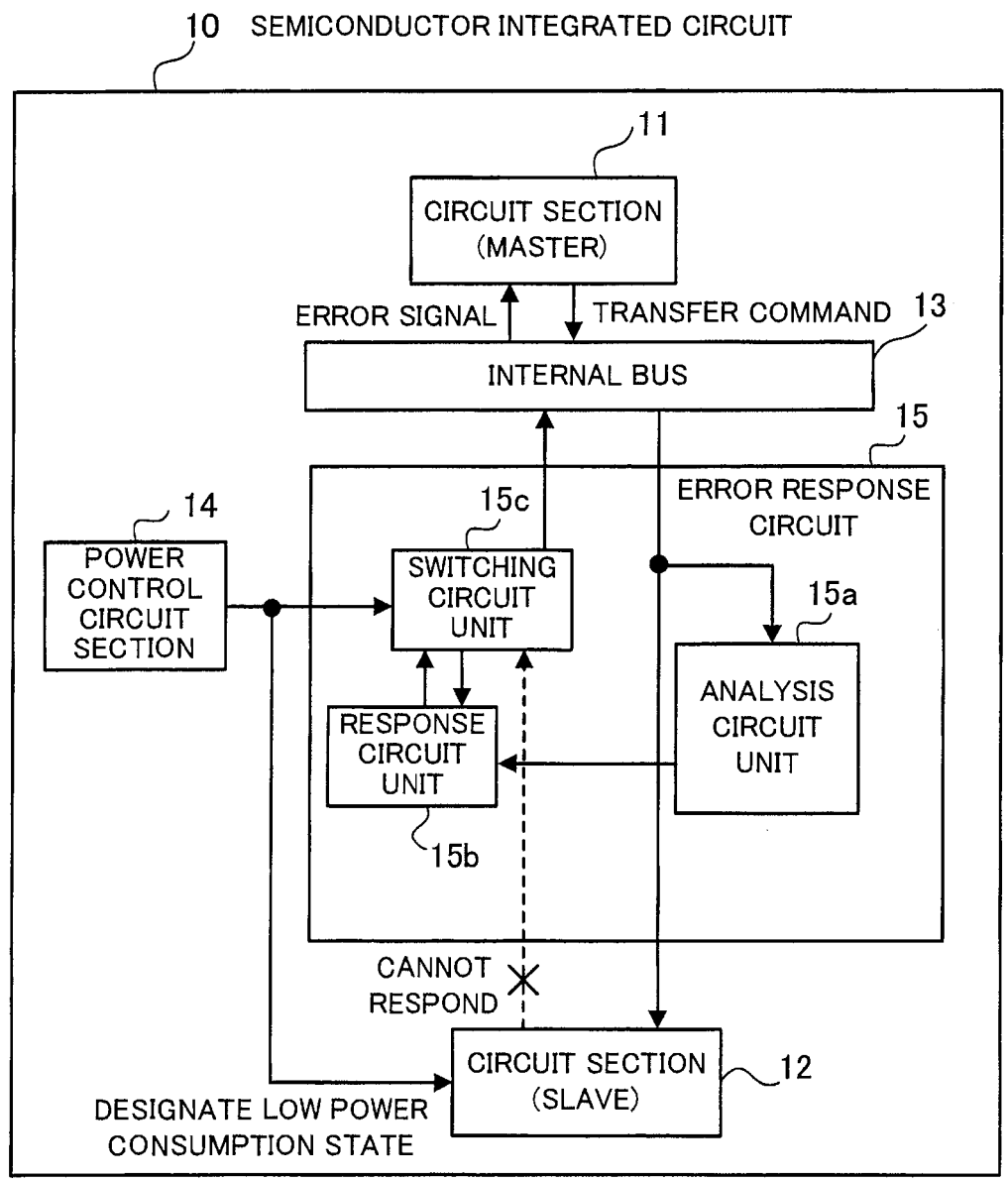
FIG. 1 is an example of a semiconductor integrated circuit according to a first embodiment.

Embodiments will now be described with reference to the accompanying drawings, wherein like reference numerals refer to like elements throughout.

(First Embodiment)

FIG. 1 is an example of a semiconductor integrated circuit according to a first embodiment.

A semiconductor integrated circuit 10 includes a circuit section (hereinafter referred to as a master) 11 which is a source of a command such as a transfer command, a circuit section (hereinafter referred to as a slave) 12 which is a destination of the command and which returns a response signal for the command to the master 11, an internal bus 13, and a power control circuit section 14. In addition, the semiconductor integrated circuit 10 according to the first embodiment includes an error response circuit 15. In the example of FIG. 1, the error response circuit 15 is disposed between the internal bus 13 and the slave 12. However, the error response circuit 15 may be disposed between the master 11 and the internal bus 13.

In FIG. 1, the flow of a signal transmitted to or received from each circuit section is indicated by an arrow.

The power control circuit section 14 outputs a power control signal and controls the power state of the slave 12. For example, the power control signal controls power supply voltage for the slave 12 or an operation clock for the slave 12 to control the power state of the slave 12. In the example of FIG. 1, the power control signal is inputted directly to the slave 12. However, the power control signal may be inputted to a circuit section (not illustrated) which supplies power supply voltage to the slave 12 or a circuit section (not illustrated) which supplies an operation clock to the slave 12.

A power control signal is also inputted to the error response circuit 15. A power control signal inputted to the error response circuit 15 and a power control signal inputted to the slave 12 may not be the same. Furthermore, in the following description it is assumed that the master 11 or the error response circuit 15 does not go into a low power consumption state simultaneously with the slave 12. That is to say, it is assumed that when the slave 12 is in a low power consumption state, the master 11 and the error response circuit 15 are in a power state in which they perform normal operation.

The error response circuit 15 includes an analysis circuit unit 15a, a response circuit unit 15b, and a switching circuit unit 15c.

The analysis circuit unit 15a analyzes a command transmitted from the master 11 to the slave 12, and detects a status of data transfer between the master 11 and the slave 12.

When the slave 12 changes from a power consumption state in which it performs normal operation to a low power consumption state (in which it does not output a response signal) in which it consumes less power, the response circuit unit 15b generates an error signal according to a status of data transfer detected by the analysis circuit unit 15a.

For example, when the switching circuit unit 15c informs the response circuit unit 15b that the slave 12 has gone into a low power consumption state during data transfer between the master 11 and the slave 12, the response circuit unit 15b generates an error signal. In addition, when the analysis circuit unit 15a detects the beginning of the transfer of data by the master 11 to the slave 12 which is in a low power consumption state, the response circuit unit 15b generates an error signal.

The switching circuit unit 15c detects by a power control signal whether or not the slave 12 is in a low power consumption state. If the slave 12 is in a low power consumption state, then the switching circuit unit 15c performs switching so as to transmit to the master 11 an error signal generated by the response circuit unit 15b in place of a response signal from the slave 12 for a command transmitted by the master 11.

An example of the operation of the semiconductor integrated circuit 10 according to the first embodiment will now be described.

If a power control signal outputted from the power control circuit section 14 designates a non-low power consumption state, then a response signal corresponding to a transfer command transmitted by the master 11 is outputted from the slave 12. The switching circuit unit 15c informs the master 11 of the response signal via the internal bus 13. By doing so, data transfer is performed.

When the power control signal designates a low power consumption state during the data transfer, the slave 12 cannot respond to the transfer command from the master 11 as illustrated in FIG. 1. When a transfer status detected by the analysis circuit unit 15a is "under transfer" and the response circuit unit 15b is informed by a signal from the switching circuit unit 15c that the slave 12 is designated to be in a low power consumption state, the response circuit unit 15b generates an error signal.

When the power control signal designates a low power consumption state, the switching circuit unit 15c performs path switching so as to transmit to the master 11 the error signal generated by the response circuit unit 15b in place of a response signal from the slave 12. As a result, the master 11 can detect that the transfer has failed, and perform a process such as stopping the transfer.

On the other hand, when the slave 12 is in a low power consumption state and the master 11 transmits to the slave 12 a command to the effect that the master 11 begins data transfer, the response circuit unit 15b generates an error signal and the switching circuit unit 15c transmits the error signal to the master 11. This is the same with the above case. As a result, the master 11 can detect that the transfer has failed, and perform a process such as stopping the transfer.

As has been described, with the semiconductor integrated circuit 10 according to the first embodiment the error response circuit 15 transmits an error signal to the master 11 even when the slave 12 is in a low power consumption state and therefore cannot return a response. This makes it possible to prevent a hang-up at the time of the transfer of data between the master 11 and the slave 12.

In the above description the response circuit unit 15b detects by a signal from the switching circuit unit 15c to which the power control signal is inputted that the slave 12 is designated to be in a low power consumption state. However, the above power control signal may also be inputted to the response circuit unit 15b.

(Second Embodiment)

Figure 2:
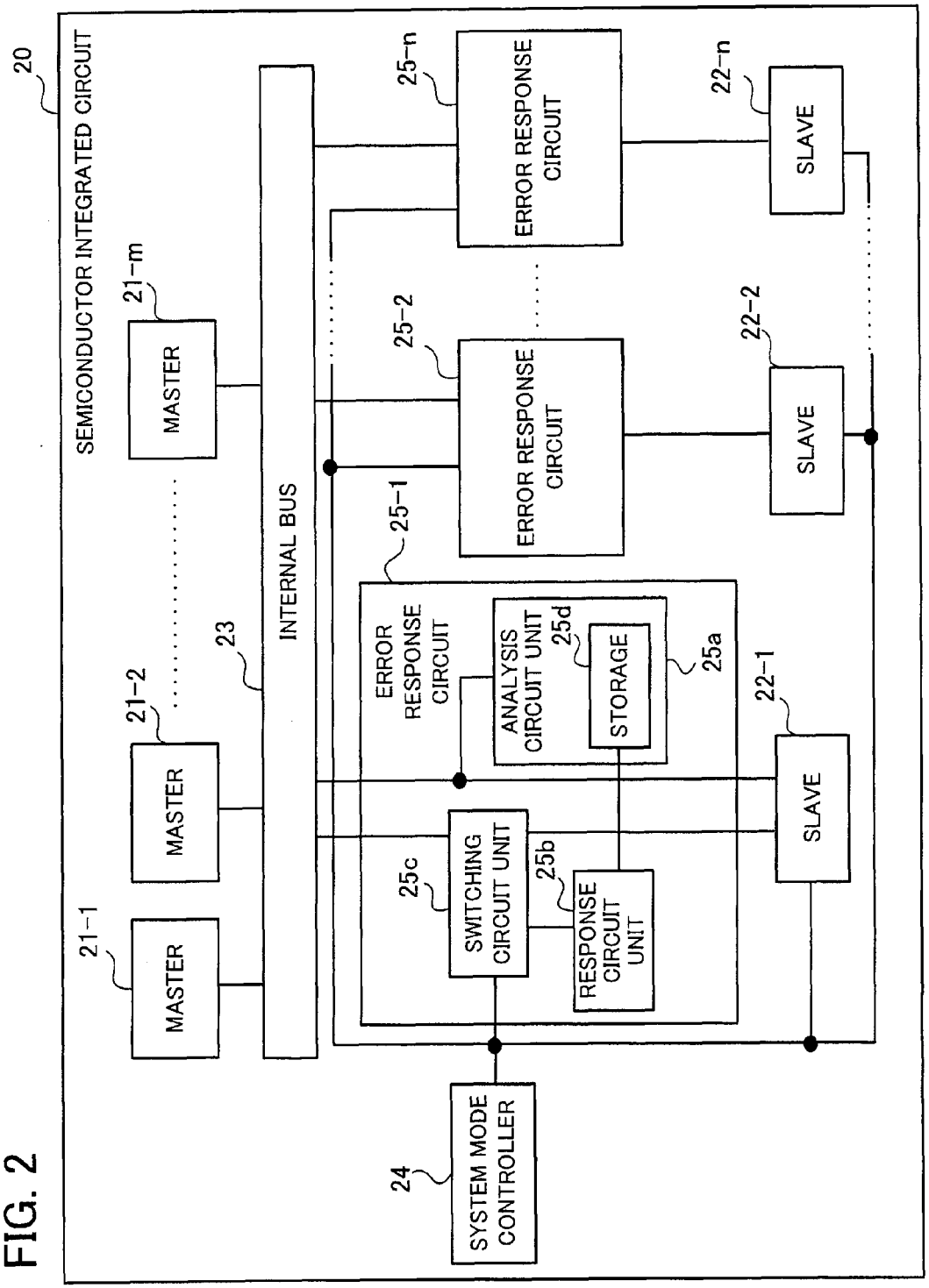
FIG. 2 is an example of a semiconductor integrated circuit according to a second embodiment.

FIG. 2 is an example of a semiconductor integrated circuit according to a second embodiment.

A semiconductor integrated circuit 20 includes a plurality of masters 21-1, 21-2, ..., and 21-m, a plurality of slaves 22-1, 22-2, ..., and 21-n, an internal bus 23, a system mode controller 24, and a plurality of error response circuits 25-1, 25-2, ..., and 25-n.

In the example of FIG. 2, the error response circuits 25-1 through 25-n are disposed between the slaves 22-1 through 21-n and the internal bus 23. However, the error response circuits 25-1 through 25-n may be disposed between the masters 21-1 through 21-m and the internal bus 23.

In addition, the number of the masters 21-1 through 21-m, the slaves 22-1 through 21-n, and the error response circuits 25-1 through 25-n illustrated in FIG. 2 is three or more. However, there is no limit to this number. m or n is set to any value greater than or equal to 1.

The system mode controller 24 has the function of the above power control circuit section 14. That is to say, the system mode controller 24 outputs a power control signal and controls the power state of each of the slaves 22-1 through 21-n. The system mode controller 24 may supply a power control signal to a circuit section which supplies power supply voltage to the slaves 22-1 through 21-n or a circuit section which supplies an operation clock to the slaves 22-1 through

21-*n*. In that case, the system mode controller 24 indirectly controls the power state of each of the slaves 22-1 through 21-*n*.

The system mode controller 24 also supplies a power control signal to the error response circuits 25-1 through 25-*n*. A power control signal supplied to the error response circuits 25-1 through 25-*n* and a power control signal supplied to the slaves 22-1 through 21-*n* may not be the same.

In the following description it is assumed that the masters 21-1 through 21-*m* or the error response circuits 25-1 through 25-*n* do not go into a low power consumption state by a power control signal simultaneously with the slaves 22-1 through 21-*n* respectively. That is to say, a power control signal inputted to a switching circuit unit 25*c* is used for determining whether or not each of the slaves 22-1 through 21-*n* is in a low power consumption state.

The error response circuit 25-1 includes an analysis circuit unit 25*a*, a response circuit unit 25*b*, and the switching circuit unit 25*c*. Each of the other error response circuits 25-2 through 25-*n* includes the same components (not illustrated).

The analysis circuit unit 25*a* analyzes a command transmitted from one of the masters 21-1 through 21-*m* to the slave 22-1, and detects a status of data transfer between the master and the slave 22-1. A status of data transfer depends on a data transfer standard. AMBA (Advanced Microcontroller Bus Architecture) is known as a data transfer standard. Furthermore, a plurality of bus standards, such as AHB (Advanced High-performance Bus), APB (Advanced Peripheral Bus), and AXI (Advanced eXtensible Interface), are defined in AMBA.

The analysis circuit unit 25*a* analyzes a command based on such a standard, and detects a data transfer status. In addition, the analysis circuit unit 25*a* includes storage 25*d* and stores a transfer command and information regarding a detected data transfer status (hereinafter referred to as transfer information) in the storage 25*d*. The storage 25*d* may be disposed outside the analysis circuit unit 25*a*.

The response circuit unit 25*b* acquires transfer information stored in the storage 25*d*, and generates a response signal corresponding to a data transfer status. Furthermore, when the slave 22-1 goes into a low power consumption state, the response circuit unit 25*b* generates an error signal according to a data transfer status. For example, when the switching circuit unit 25*c* informs the response circuit unit 25*b* that the slave 22-1 has gone into a low power consumption state during data transfer between a master and the slave 22-1, the response circuit unit 25*b* generates an error signal. In addition, when the analysis circuit unit 25*a* detects the beginning of the transfer of data by one of the masters 21-1 through 21-*m* to the slave 22-1 which is in a low power consumption state, the response circuit unit 25*b* generates an error signal.

The switching circuit unit 25*c* detects by a power control signal supplied from the system mode controller 24 whether or not the slave 22-1 is in a low power consumption state. If the slave 22-1 is in a low power consumption state, then the switching circuit unit 25*c* returns an error signal generated by the response circuit unit 25*b* to one of the masters 21-1 through 21-*m* which transmits a command in place of a response signal to the command from the slave 22-1.

In the above example, the response circuit unit 25*b* detects by the switching circuit unit 25*c* whether or not the slave 22-1 is in a low power consumption state. However, a power control signal may also be inputted to the response circuit unit 25*b*. By doing so, the response circuit unit 25*b* can also detect whether or not the slave 22-1 is in a low power consumption state.

An example of a data transfer control method using the semiconductor integrated circuit 20 according to the second embodiment will now be described.

(Data Transfer Control Method)

Figure 3:
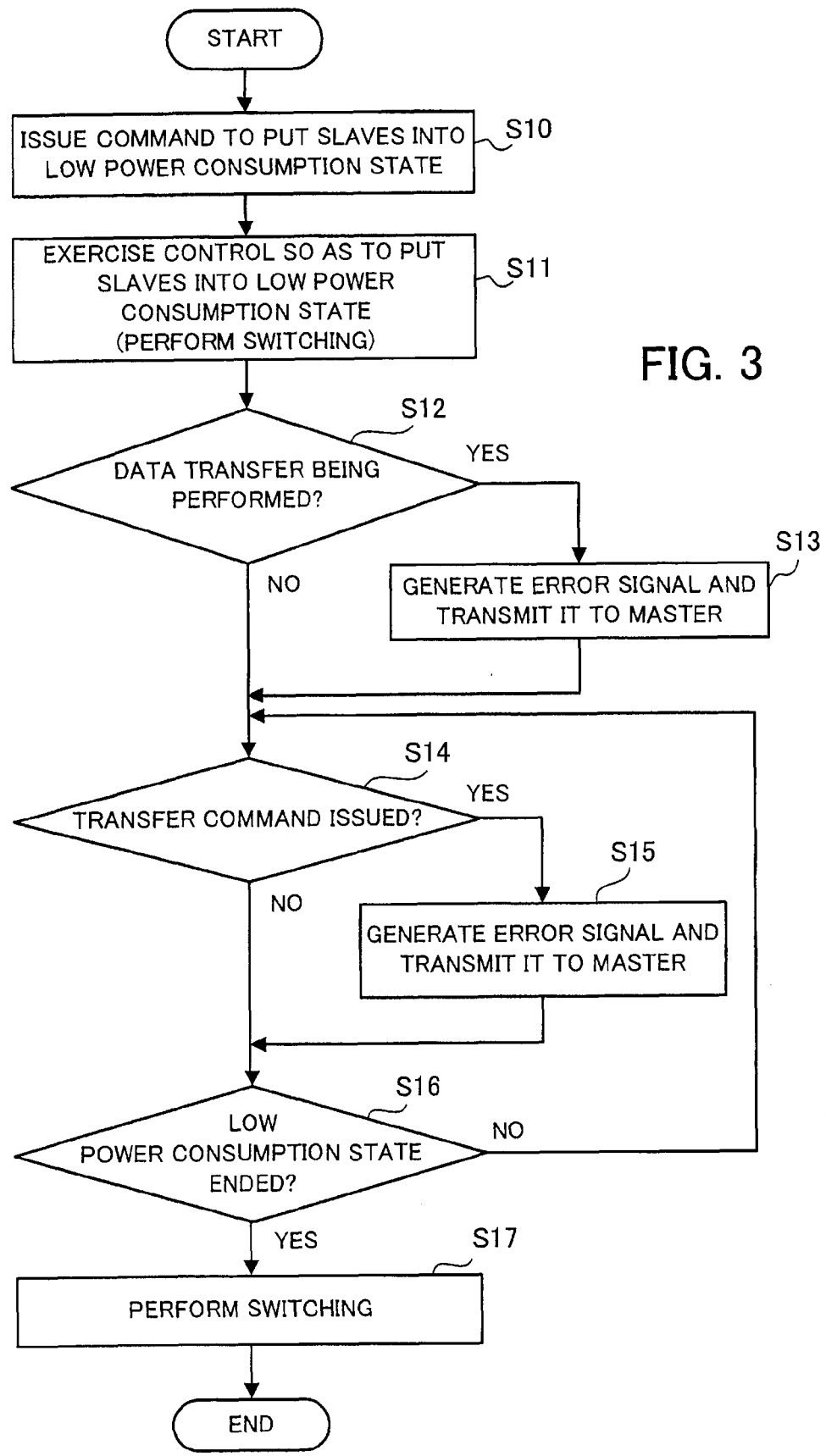
FIG. 3 is a flow chart of an example of a data transfer control method at the time of slaves being put into a low power consumption state.

FIG. 3 is a flow chart of an example of a data transfer control method at the time of the slaves being put into a low power consumption state.

For example, when a command to put the slaves into a low power consumption state is issued by firmware (step S10), the system mode controller 24 exercises control so as to put the slaves 22-1 through 22-*n* into a low power consumption state (step S11). At this time the switching circuit units 25*c* included in the error response circuits 25-1 through 25-*n* perform path switching so as to transmit signals generated by the response circuit units 25*b* to the masters 21-1 through 21-*m* in place of response signals from the slaves 22-1 through 22-*n* to the masters 21-1 through 21-*m*. Control may be exercised so as to put the slaves 22-1 through 22-*n* individually into a low power consumption state.

The response circuit units 25*b* then refer to transfer information stored in the storage 25*d* of the analysis circuit units 25*a* of the error response circuits 25-1 through 25-*n* and determine whether or not data transfer is being performed (step S12). If data transfer is being performed, then a response circuit unit 25*b* generates and outputs an error signal. For example, if data transfer is being performed between the master 21-1 and the slave 22-1, then the switching circuit unit 25*c* transmits to the master 21-1 an error signal generated by the response circuit unit 25*b* (step S13).

If data transfer is not being performed or after step S13 is performed, step S14 is performed. In step S14, the response circuit units 25*b* determine on the basis of the transfer information and signals from the switching circuit units 25*c* whether or not a transfer command is issued from one of the masters 21-1 through 21-*m* at the time of the slaves 22-1 through 22-*n* being in a low power consumption state.

If a transfer command is issued, then a response circuit unit 25*b* generates and outputs an error signal. For example, if the master 21-1 issues a transfer command to the slave 22-1 which is in a low power consumption state, then the response circuit unit 25*b* of the error response circuit 25-1 generates an error signal. The switching circuit unit 25*c* then transmits to the master 21-1 the error signal generated by the response circuit unit 25*b* (step S15).

If a transfer command is not issued or after step S15 is performed, step S16 is performed. In step S16, the response circuit units 25*b* determine on the basis of signals from the switching circuit units 25*c* whether or not the low power consumption state of the slaves 22-1 through 22-*n* has ended (step S16). If the low power consumption state of the slaves 22-1 through 22-*n* has not ended, then the process is repeated from step S14. If the low power consumption state of the slaves 22-1 through 22-*n* has ended, then the switching circuit units 25*c* of the error response circuits 25-1 through 25-*n* perform switching so as to transmit response signals from the slaves 22-1 through 22-*n* to the masters 21-1 through 21-*m* (step S17). As a result, a data transfer control process performed at the time of the slaves 22-1 through 22-*n* shifting to and returning from a low power consumption state ends.

An example of the operation of the semiconductor integrated circuit 20 performed at the time of each of the three bus standards (AHB, APB, and AXI), for example, being applied will now be described in further detail.

(Example of a Signal in the Error Response Circuit at AHB Application Time)

Figure 4:
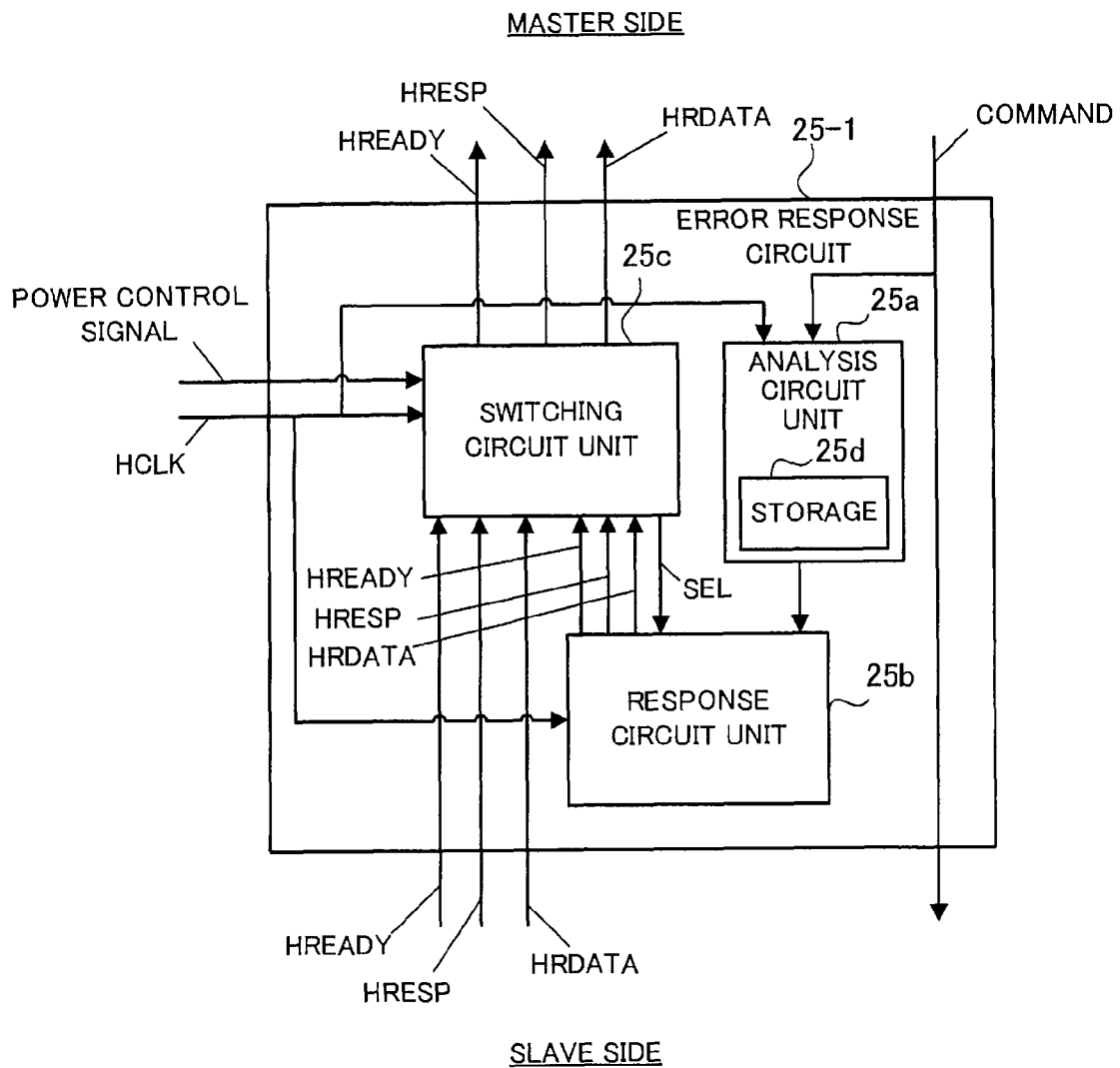
FIG. 4 is an example of a signal in an error response circuit at AHB application time.

FIG. 4 is an example of a signal in the error response circuit at AHB application time. FIG. 4 indicates an example of a signal in the error response circuit 25-1 illustrated in FIG. 2. The same signals are used in the other error response circuits 25-2 through 25-*n*.

A command (command indicative of which transfer is to be performed, for example) from the master side and a clock signal HCLK from a circuit section (not illustrated) which generates an operation clock are inputted to the analysis circuit unit 25*a*.

Transfer information which is analyzed by the analysis circuit unit 25*a* and which is stored in the storage 25*d*, a signal SEL from the switching circuit unit 25*c* which indicates that a slave has gone into a low power consumption state, and the clock signal HCLK are inputted to the response circuit unit 25*b*. In addition, the response circuit unit 25*b* outputs signals HREADY, HRESP, and HRDATA. These signals and signals HREADY, HRESP, and HRDATA outputted from the slave side are of the same kinds.

The signal HREADY indicates whether to prolong transfer. The signal HRESP indicates a status of transfer. A status of transfer is "OK", "ERROR", "RETRY", or the like. The signal HRDATA is data transmitted at read time from the slave side to the master side. The signal HRDATA outputted from the response circuit unit 25*b* indicates a state in which data is an arbitrary value.

A power control signal is inputted from the system mode controller 24 to the switching circuit unit 25*c*. The signals HREADY, HRESP, and HRDATA are inputted from the slave side and the response circuit unit 25*b* to the switching circuit unit 25*c*. In addition, the clock signal HCLK is inputted to the switching circuit unit 25*c*. Furthermore, the switching circuit unit 25*c* outputs according to the power control signal the signals HREADY, HRESP, and HRDATA inputted from the slave side or the response circuit unit 25*b*.

(Example of the Operation of the Semiconductor Integrated Circuit 20 at AHB Application Time)

Description will now be given with a case where data transfer is performed between the master 21-1 and the slave 22-1 as an example.

Figure 5:
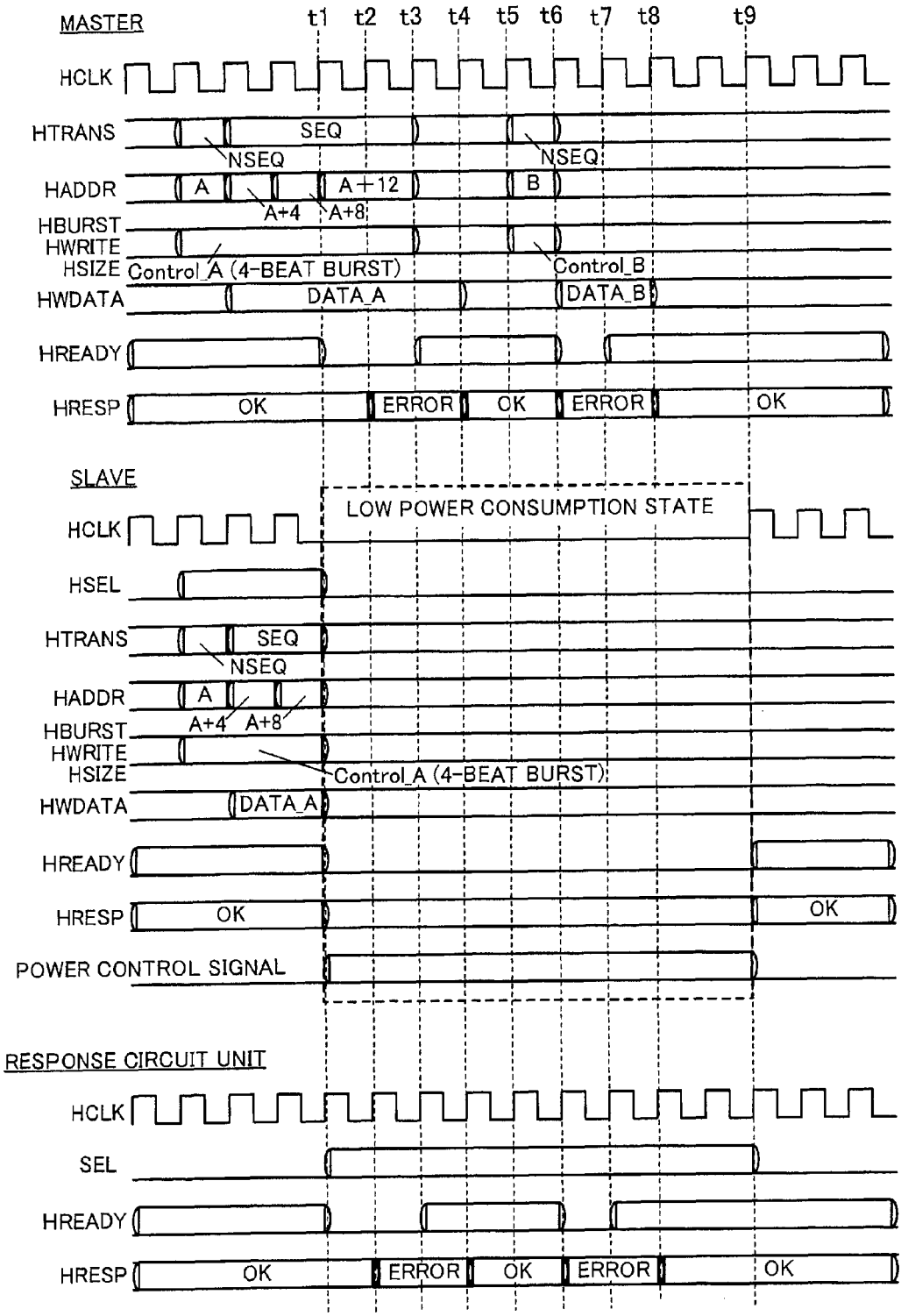
FIG. 5 is a timing chart of a first example of the operation of the semiconductor integrated circuit at AHB application time.

FIG. 5 is a timing chart of a first example of the operation of the semiconductor integrated circuit at AHB application time. FIG. 5 indicates the state of each signal in the master 21-1, the slave 22-1, and the response circuit unit 25*b*.

A clock signal HCLK and signals HTRANS, HADDR, HBURST, HWRITE, HSIZE, and HWDATA outputted from the master 21-1 as a command or data are signals in the master 21-1. In addition, signals HREADY and HRESP inputted to the master 21-1 are indicated.

The signal HTRANS indicates a transfer type. A transfer type is "NONSEQUENTIAL", "SEQUENTIAL", "IDLE", or "BUSY". The signal HADDR indicates an address. The signal HBURST indicates a burst transfer type. The signal HWRITE indicates whether or not write transfer is performed. The signal HSIZE indicates transfer size.

A clock signal HCLK, signals HSEL, HTRANS, HADDR, HBURST, HWRITE, HSIZE, and HWDATA, a power control signal, and the like are supplied to the slave 22-1. Signals HREADY, HRESP, and the like are outputted from the slave 22-1. The signal HSEL supplied to the slave 22-1 is a slave circuit section signal supplied from a decoder (not illustrated).

In the following example, it is assumed that when a power control signal is "1" (signal level is at an H (High) level), the slave 22-1 is in a low power consumption state. In addition, it is assumed that when a power control signal is "0" (signal level is at an L (Low) level), the slave 22-1 is in a non-low power consumption state.

A clock signal HCLK and a signal SEL are supplied to the response circuit unit 25*b*. In addition, signals HREADY, HRESP, and the like are outputted from the response circuit unit 25*b*. The signal SEL supplied to the response circuit unit 25*b* is supplied from the switching circuit unit 25*c* and indicates whether or not the slave 22-1 is in a low power consumption state (non-selected state).

In FIG. 5, until timing t1 the power control signal is "0" and the slave 22-1 is in a non-low power consumption state. At this time write transfer is performed between the master 21-1 and the slave 22-1. In the example of FIG. 5, transfer is performed under the Control_A control under which 4-beat burst transfer the type of which is "NONSEQUENTIAL" (abbreviated as NSEQ) and "SEQUENTIAL" (abbreviated as SEQ) is performed. The addresses A, A+4, A+8, and A+12 are designated in the signal HADDR. In addition, the write data DATA_A is outputted from the master 21-1 as the signal HWDATA.

When the signal HSEL becomes "1", the slave 22-1 receives the write data DATA_A on the basis of the signals HTRANS, HADDR, HBURST, HWRITE, and HSIZE. Furthermore, the slave 22-1 outputs the signal HREADY indicative of the completion of transfer and the signal HRESP indicative of the transfer status "OK" which means that the transfer is performed correctly.

In addition, until the timing t1 the response circuit unit 25*b* outputs the signals HREADY and HRESP indicative of an idle state. The signals HREADY and HRESP outputted from the response circuit unit 25*b* and the signals HREADY and HRESP outputted from the slave 22-1 are of the same kinds.

When the power control signal becomes "1" at the timing t1, the slave 22-1 goes into a low power consumption state and cannot respond. At this time the switching circuit unit 25*c* switches a response path so as to transmit to the master 21-1 a signal outputted from the response circuit unit 25*b*. Furthermore, the switching circuit unit 25*c* sets the signal SEL to "1". When the signal SEL changes, the response circuit unit 25*b* determines from transfer information (values of the signal HTRANS and the like) stored in the storage 25*d* of the analysis circuit unit 25*a* that transfer is being performed, set the signal HREADY to "0", and generates a wait. The master 21-1 detects the wait at timing t2. As a result, the write transfer from the master 21-1 is deferred temporarily to perform a timing adjustment.

In addition, at the timing t2 the response circuit unit 25*b* outputs the signal HRESP indicative of the transfer status "ERROR" for two clock cycles. Furthermore, the response circuit unit 25*b* sets the signal HREADY to "1" at timing t3. As a result, the master 21-1 detects at the timing t3 and timing t4 that normal write transfer cannot be performed.

At the timing t4 the response circuit unit 25*b* determines from the transfer information stored in the storage 25*d* of the analysis circuit unit 25*a* that the transfer is stopped, outputs the signal HRESP indicative of the transfer status "OK", and keeps the signal HREADY at "1". At timing t5 the master 21-1 detects the signals HRESP and HREADY.

Though the slave 22-1 is in a low power consumption state at the timing t5, the master 21-1 issues a transfer command. In the example of FIG. 5, write transfer the type of which is "NONSEQUENTIAL" is performed under the Control_B control. The address B is designated in the signal HADDR. In addition, at timing t6 the write data DATA_B is outputted from the master 21-1 as the signal HWDATA.

At the timing t6 the response circuit unit 25*b* determines from the transfer information stored in the storage 25*d* of the analysis circuit unit 25*a* that transfer is being performed, and outputs again the signal HRESP indicative of the transfer status "ERROR" for two clock cycles. Furthermore, the response circuit unit 25b sets the signal HREADY to "1" at timing t7. As a result, the master 21-1 detects at the timing t7 and timing t8 that normal write transfer cannot be performed.

When the power control signal becomes "0" at timing t9, the slave 22-1 returns from a low power consumption state. When the switching circuit unit 25c confirms that transfer is not yet performed, the switching circuit unit 25c performs switching so as to transmit to the master 21-1 the signals HREADY and HRESP outputted from the slave 22-1.

A second example of the operation of the semiconductor integrated circuit 20 at AHB application time will now be described.

Figure 6:
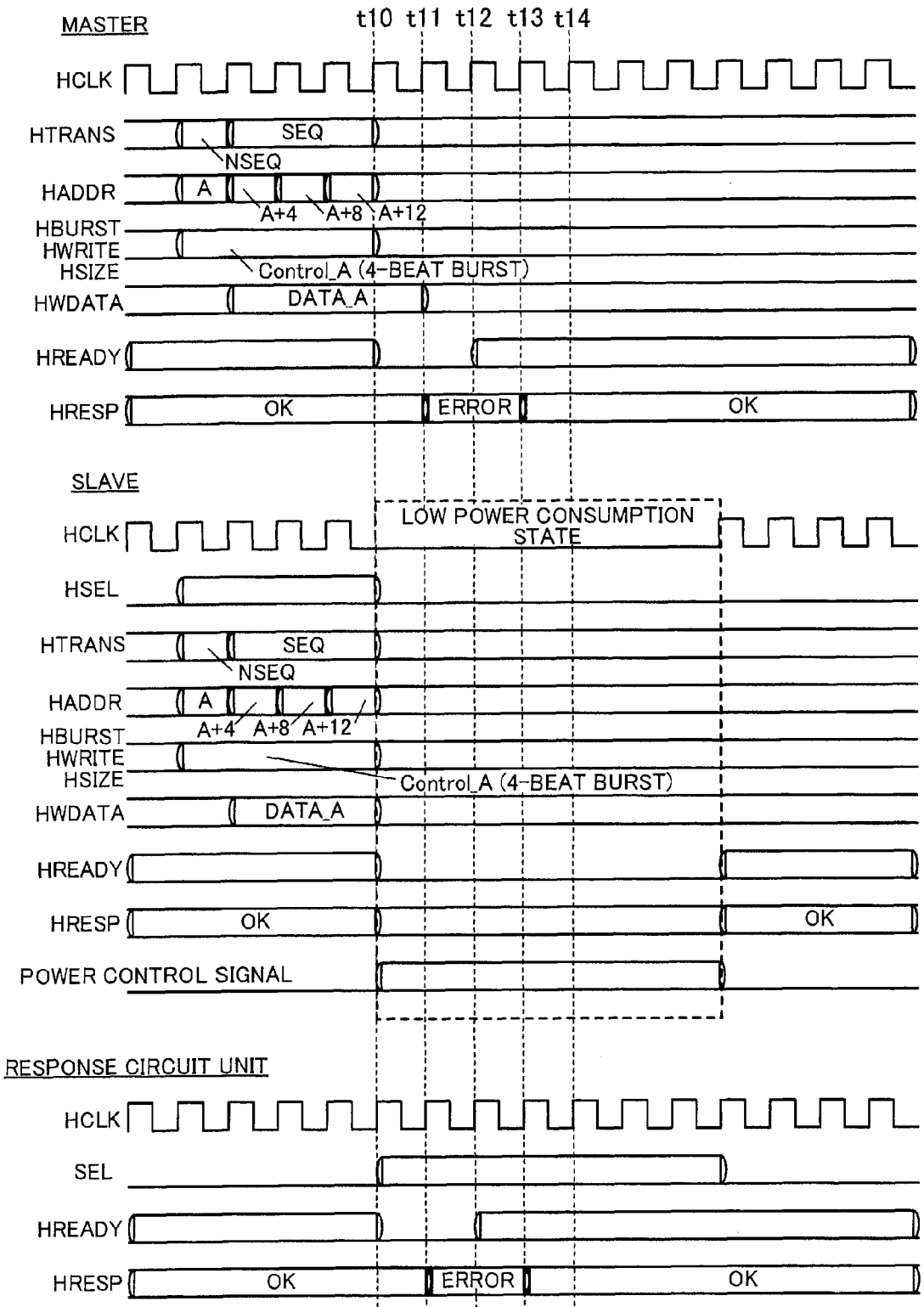
FIG. 6 is a timing chart of a second example of the operation of the semiconductor integrated circuit at AHB application time.

FIG. 6 is a timing chart of a second example of the operation of the semiconductor integrated circuit at AHB application time. FIG. 6 is an example of the operation performed in a case where the slave 22-1 is put into a low power consumption state at the time of the master 21-1 being waiting for a response in a data phase after issuing all transfer commands in an address phase. Signals indicated in FIG. 6 and the signals indicated in FIG. 5 are of the same kinds.

When the designation by the master 21-1 of the addresses A, A+4, A+8, and A+12 ends at timing t10, a power control signal becomes "1" and the slave 22-1 goes into a low power consumption state. Accordingly, the slave 22-1 cannot respond. At this time the switching circuit unit 25c performs switching so as to transmit to the master 21-1 a signal outputted from the response circuit unit 25b. In addition, the switching circuit unit 25c sets the signal SEL to "1". The response circuit unit 25b determines from the transfer information stored in the storage 25d of the analysis circuit unit 25a that transfer is being performed, set the signal HREADY to "0", and generates a wait. The master 21-1 detects the wait at timing t11. As a result, write transfer from the master 21-1 is deferred temporarily to perform a timing adjustment.

In addition, at the timing t11 the response circuit unit 25b outputs the signal HRESP indicative of the transfer status "ERROR" for two clock cycles. Furthermore, the response circuit unit 25b sets the signal HREADY to "1" at timing t12. As a result, the master 21-1 detects at the timing t12 and timing t13 that normal write transfer cannot be performed.

At the timing t13 the response circuit unit 25b determines from the transfer information stored in the storage 25d of the analysis circuit unit 25a that the transfer is stopped, outputs the signal HRESP indicative of the transfer status "OK", and keeps the signal HREADY at "1". At timing t14 the master 21-1 detects the signals HRESP and HREADY.

A third example of the operation of the semiconductor integrated circuit 20 at AHB application time will now be described.

Figure 7:
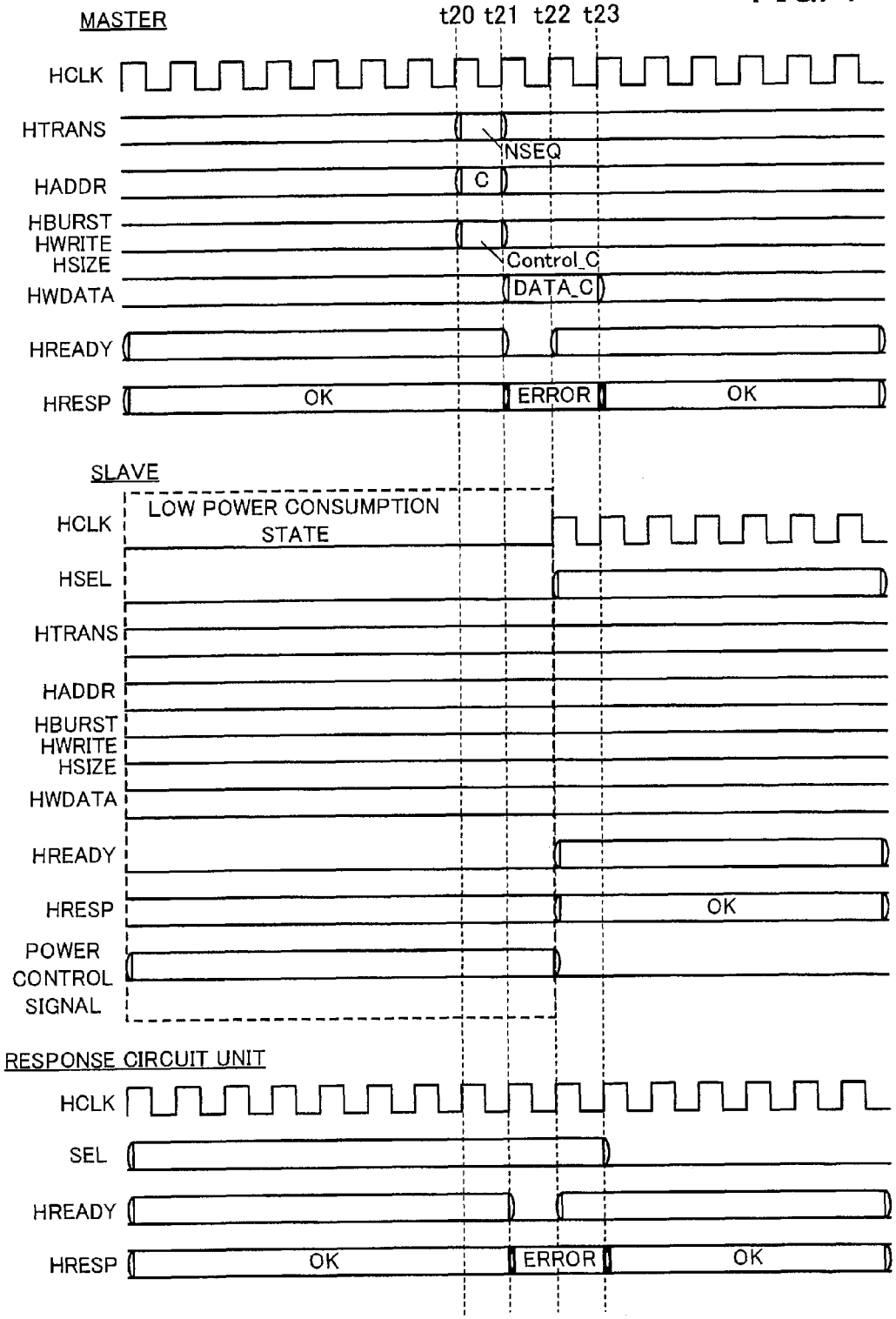
FIG. 7 is a timing chart of a third example of the operation of the semiconductor integrated circuit at AHB application time.

FIG. 7 is a timing chart of a third example of the operation of the semiconductor integrated circuit at AHB application time. FIG. 7 is an example of the operation performed in a case where the master 21-1 begins transfer at the time of the slave 22-1 being in a low power consumption state and where the low power consumption state of the slave 22-1 is released during an error response by the error response circuit 25-1. Signals indicated in FIG. 7 and the signals indicated in FIG. 5 or 6 are of the same kinds.

When the slave 22-1 is in a low power consumption state, the master 21-1 issues a transfer command at timing t20. In the example of FIG. 7, write transfer the type of which is "NONSEQUENTIAL" is performed under the Control_C control. The address C is designated in the signal HADDR. In addition, at timing t21 the write data DATA_C is outputted from the master 21-1 as the signal HWDATA.

At the timing t21 the response circuit unit 25b detects by the transfer information stored in the storage 25d of the analysis circuit unit 25a that transfer is begun, and sets the signal HREADY to "0". In addition, the response circuit unit 25b outputs the signal HRESP indicative of the transfer status "ERROR" for two clock cycles. Furthermore, the response circuit unit 25b sets the signal HREADY to "1" at timing t22. As a result, the master 21-1 detects at the timing t22 and timing t23 that normal write transfer cannot be performed.

Furthermore, in the example of FIG. 7, a power control signal becomes "0" at the timing 22 and the low power consumption state of the slave 22-1 is released. However, the response circuit unit 25b is in the middle of returning an error response to the master 21-1, so the switching circuit unit 25c maintains transmission of a signal from the response circuit unit 25b to the master 21-1. When the switching circuit unit 25c confirms at timing t23 that the error response ends and that transfer is not yet performed, the switching circuit unit 25c performs switching so as to transmit to the master 21-1 the signals HREADY, HRESP, and the like outputted from the slave 22-1. The standard prescribes that an error response must be made for two clock cycles. The above process makes it possible to avoid a violation of the standard.

Figure 8:
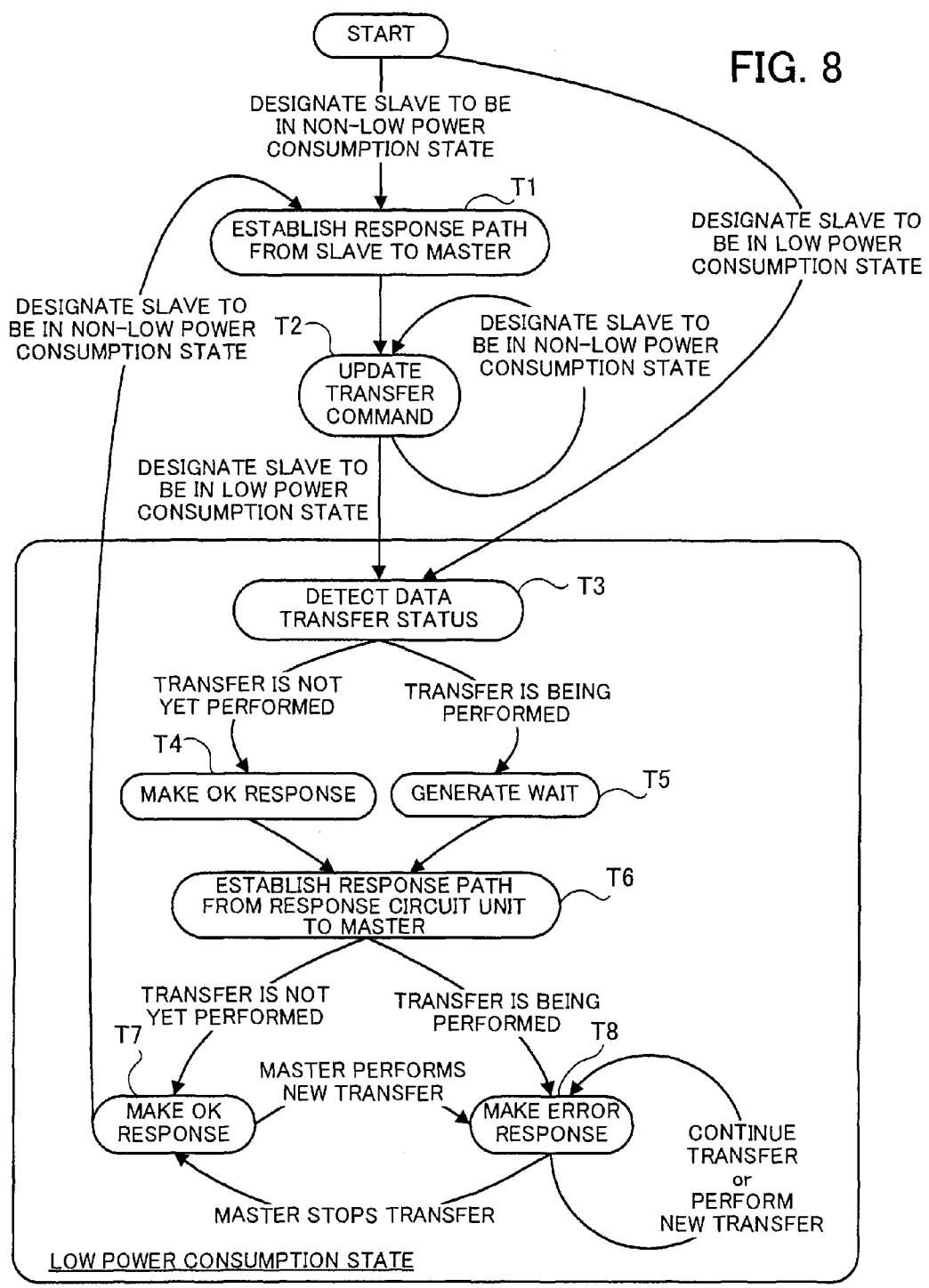
FIG. 8 is an example of state transition of the semiconductor integrated circuit at AHB application time.

FIG. 8 is an example of state transition of the semiconductor integrated circuit at AHB application time.

If a power control signal designates the slave 22-1 to be in a non-low power consumption state (for example, if a power control signal is "0"), then the semiconductor integrated circuit 20 goes into a state T1 in which path switching is performed so as to establish a response path from the slave 22-1 to the master 21-1. On the other hand, if the power control signal designates the slave 22-1 to be in a low power consumption state (for example, if a power control signal is "1"), then the semiconductor integrated circuit 20 makes a transition to a state T3.

After being is the state T1, the semiconductor integrated circuit 20 goes into a state T2 in which the preceding transfer command stored in the storage 25d is updated with a write or read transfer command under execution. If the power control signal designates the slave 22-1 at the time of the semiconductor integrated circuit 20 being in the state T2 to be in a non-low power consumption state, then the state T2 is maintained. On the other hand, if the power control signal instructs the slave 22-1 at the time of the semiconductor integrated circuit 20 being in the state T2 to go into a low power consumption state, then the semiconductor integrated circuit 20 makes a transition to a state T3.

When the semiconductor integrated circuit 20 is in the state T3, a state T4, a state T5, a state T6, a state T7, or a state T8, the slave 22-1 is in a low power consumption state. When the semiconductor integrated circuit 20 is in the state T3, the analysis circuit unit 25a of the error response circuit 25-1 analyzes the transfer command after the update in the storage 25d and detects a data transfer status. If transfer is not yet performed, then the semiconductor integrated circuit 20 makes a transition to the state T4 in which the response circuit unit 25b makes an OK response (in which the response circuit unit 25b outputs the signal HRESP indicative of the transfer status "OK" and the signal HREADY of "1"). On the other hand, if transfer is being performed, then the semiconductor integrated circuit 20 makes a transition to the state T5 in which the response circuit unit 25b generates a wait.

When the semiconductor integrated circuit 20 is in the state T6 indicated after the state T4 or T5, the switching circuit unit 25c performs path switching so as to establish a response path from the response circuit unit 25b to the master 21-1. The state T6 arises at the same timing at which the state T4 or T5 arises. In the above FIG. 5, for example, at the timing t1, the power control signal becomes "1" and the switching circuit unit 25c establishes a response path from the response circuit unit 25b to the master 21-1. At this timing t1, the signal HREADY becomes "0" and the response circuit unit 25b generates a wait.

After being in the state T6, the semiconductor integrated circuit 20 makes a transition to the state T7 in which the response circuit unit 25b makes an OK response, in the case of transfer not yet being performed. On the other hand, after being in the state T6, the semiconductor integrated circuit 20 makes a transition to the state T8 in which the response circuit unit 25b makes an error response, in the case of transfer being under performance.

If the power control signal designates the slave 22-1 at the time of the semiconductor integrated circuit 20 being in the state T7 to be in a non-low power consumption state, then the semiconductor integrated circuit 20 returns to the state T1. Furthermore, if new transfer of data to the slave 22-1 is performed by the master 21-1 at the time of the semiconductor integrated circuit 20 being in the state T7, then the semiconductor integrated circuit 20 makes a transition to the state T8.

If the master 21-1 stops the transfer of data to the slave 22-1 at the time of the semiconductor integrated circuit 20 being in the state T8, then the semiconductor integrated circuit 20 makes a transition to the state T7. Furthermore, if the master 21-1 ignores an error response and continues the transfer of data at the time of the semiconductor integrated circuit 20 being in the state T8, or if the master 21-1 stops the transfer of data to the slave 22-1 and performs the next new data transfer at the time of the semiconductor integrated circuit 20 being in the state T8, then the state T8 is maintained.

As has been described, with the semiconductor integrated circuit 20 according to the second embodiment the error response circuit 25-1 can return an error response to the master 21-1 even if the slave 22-1 goes into a low power consumption state during transfer or even if transfer is performed at the time of the slave 22-1 being a low power consumption state. This makes it possible to prevent a hang-up of the master 21-1 and a hang-up of the entire system.

(Example of a Signal in the Error Response Circuit at APB Application Time)

Figure 9:
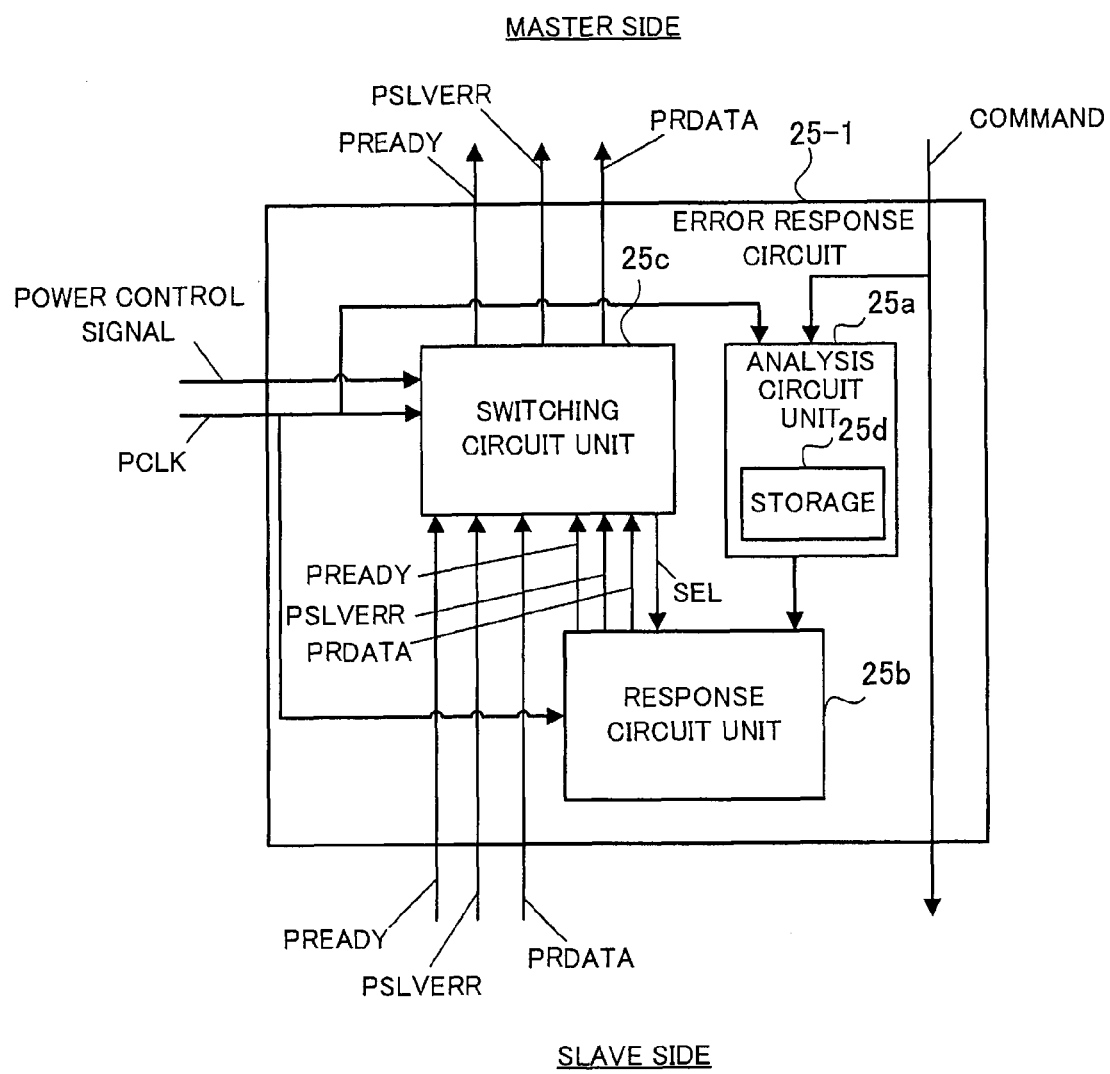
FIG. 9 is an example of a signal in the error response circuit at APB application time.

FIG. 9 is an example of a signal in the error response circuit at APB application time. FIG. 9 also indicates an example of a signal in the error response circuit 25-1 illustrated in FIG. 2. The same signals are used in the other error response circuits 25-2 through 25-n.

A command (command indicative of which transfer is to be performed, for example) from the master side and a clock signal PCLK from a circuit section (not illustrated) which generates an operation clock are inputted to the analysis circuit unit 25a.

Transfer information which is analyzed by the analysis circuit unit 25a and which is stored in the storage 25d, a signal SEL from the switching circuit unit 25c which indicates that a slave has gone into a low power consumption state, and the clock signal PCLK are inputted to the response circuit unit 25b. In addition, the response circuit unit 25b outputs signals PREADY, PSLVERR, and PRDATA. These signals and signals PREADY, PSLVERR, and PRDATA outputted from the slave side are of the same kinds.

The signal PREADY indicates whether to prolong transfer. The signal PSLVERR indicates that transfer has failed. The signal PRDATA is data transmitted at read time from the slave side to the master side. The signal PRDATA outputted from the response circuit unit 25b indicates a state in which data is an arbitrary value.

A power control signal is inputted from the system mode controller 24 to the switching circuit unit 25c. The signals PREADY, PSLVERR, and PRDATA are inputted from the slave side and the response circuit unit 25b to the switching circuit unit 25c. In addition, the clock signal PCLK is inputted to the switching circuit unit 25c. Furthermore, the switching circuit unit 25c outputs according to the power control signal the signals PREADY, PSLVERR, and PRDATA inputted from the slave side or the response circuit unit 25b.

(Example of the Operation of the Semiconductor Integrated Circuit 20 at APB Application Time)

The operation of the semiconductor integrated circuit 20 at APB application time is almost the same as that of the semiconductor integrated circuit 20 at AHB application time.

The signals indicated in FIG. 9 are used at AHB application time for the operation of the semiconductor integrated circuit 20. The response circuit unit 25b detects by the signal SEL outputted from the switching circuit unit 25c that the slave 22-1 has gone into a low power consumption state, and generates a response signal corresponding to a transfer status. When the switching circuit unit 25c detects by a power control signal that the slave 22-1 has gone into a low power consumption state, the switching circuit unit 25c selects the signals PREADY, PSLVERR, and PRDATA generated by the response circuit unit 25b as signals PREADY, PSLVERR, and PRDATA to be transmitted to the master 21-1.

If transfer is being performed between the master 21-1 and the slave 22-1 at the time of the slave 22-1 going into a low power consumption state, then the response circuit unit 25b sets the signal PREADY to "0" and generates a wait. After that, the response circuit unit 25b generates an error response by the signals PSLVERR and PREADY.

As has been described, with the semiconductor integrated circuit 20 according to the second embodiment the same effect that is achieved at AHB application time can be obtained even if APB is applied. In addition, transfer can be performed in accordance with the APB standard.

(Example of a Signal in the Error Response Circuit at AXI Application Time)

Figure 10:
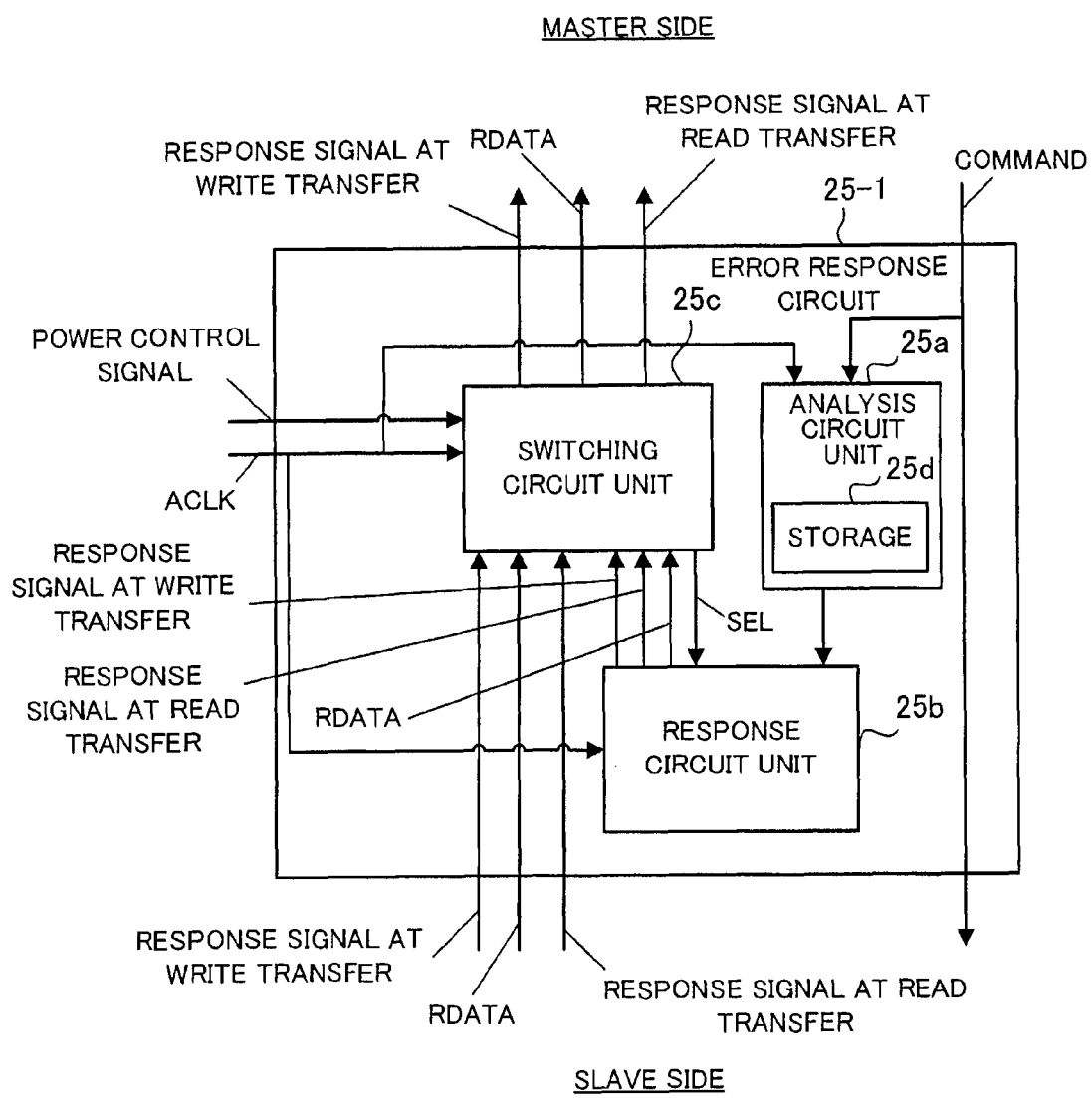
FIG. 10 is an example of a signal in the error response circuit at AXI application time.

FIG. 10 is an example of a signal in the error response circuit at AXI application time. FIG. 10 also indicates an example of a signal in the error response circuit 25-1 illustrated in FIG. 2. The same signals are used in the other error response circuits 25-2 through 25-n.

A command (command indicative of which transfer is to be performed, for example) from the master side and a clock signal ACLK from a circuit section (not illustrated) which generates an operation clock are inputted to the analysis circuit unit 25a.

Transfer information which is analyzed by the analysis circuit unit 25a and which is stored in the storage 25d, a signal SEL from the switching circuit unit 25c which indicates that a slave has gone into a low power consumption state, and the clock signal ACLK are inputted to the response circuit unit 25b. In addition, the response circuit unit 25b outputs a response signal at write transfer time, a response signal at read transfer time, and a signal RDATA. These signals and a response signal at write transfer time, a response signal at read transfer time, and a signal RDATA outputted from the slave side are of the same kinds.

A response signal at write transfer time is a signal AWREADY, WREADY, BRESP, BVALID, or the like. The signal AWREADY indicates whether or not the slave side is ready to receive a write address. The signal WREADY indicates whether or not the slave side is ready to receive write data. The signal BRESP indicates a transfer status at write transfer time. A transfer status is, for example, "SLVERR" used for returning a slave error state. The signal BVALID indicates whether or not there is a valid response.

A response signal at read transfer time is a signal ARREADY, RRESP, or the like. The signal ARREADY indicates whether or not the slave side is ready to receive a read address. The signal RRESP indicates a transfer status at read transfer time. A transfer status is, for example, "SLVERR" used by the slave side for returning an error state.

The signal RDATA is read data transmitted at read transfer time from the slave side to the master side. The signal RDATA outputted from the response circuit unit 25b indicates a state in which data is an arbitrary value.

A power control signal is inputted from the system mode controller 24 to the switching circuit unit 25c. The response signals at write transfer time, the response signals at read transfer time, and the signals RDATA are inputted from the slave side and the response circuit unit 25b to the switching circuit unit 25c. In addition, the clock signal ACLK is inputted to the switching circuit unit 25c. Furthermore, the switching circuit unit 25c outputs according to the power control signal the response signal at write transfer time, the response signal at read transfer time, the signal RDATA, and the like inputted from the slave side or the response circuit unit 25b.

(Example of the Operation of the Semiconductor Integrated Circuit 20 at AXI Application Time)

An example of the operation of the semiconductor integrated circuit 20 at AXI application time will now be described with a case where data transfer (write transfer or read transfer) is performed between the master 21-1 and the slave 22-1 as an example.

Figure 11:
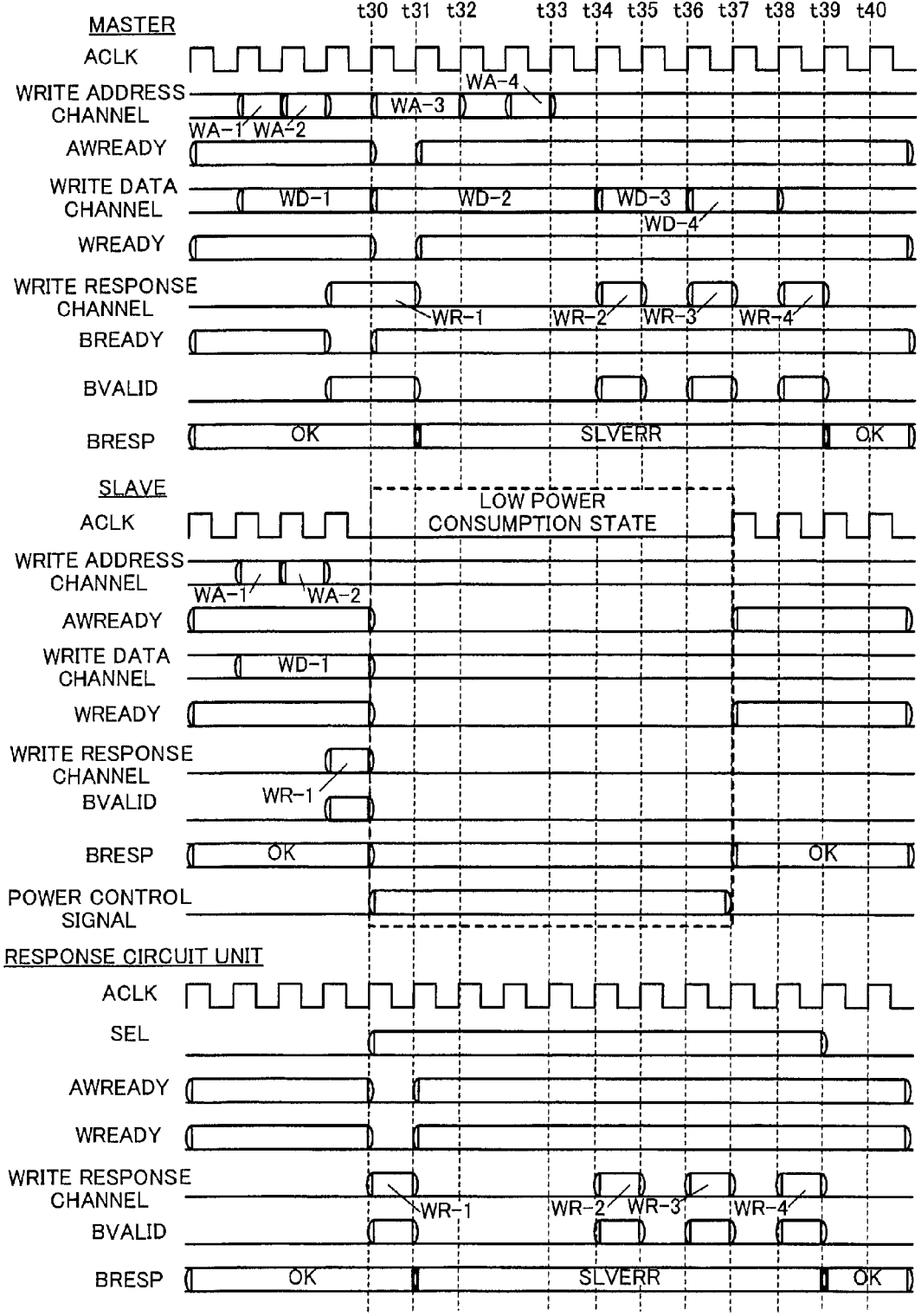
FIG. 11 is a timing chart of an example of the operation at write transfer time of the semiconductor integrated circuit at AXI application time.

FIG. 11 is a timing chart of an example of the operation at write transfer time of the semiconductor integrated circuit at AXI application time. FIG. 11 indicates a state of each signal in the master 21-1, the slave 22-1, and the response circuit unit 25b.

A clock signal ACLK and response signals at write transfer time, such as signals AWREADY, WREADY, BVALID, and BRESP, transmitted from the slave 22-1 or the error response circuit 25-1 are supplied to the master 21-1 at write transfer time. In addition, a signal BREADY outputted from the master 21-1 is indicated. The signal BREADY indicates whether or not the master 21-1 is in a state in which it can receive a response signal from the slave side.

FIG. 11 also indicates a state of each of a write address channel, a write data channel, and a write response channel on the master 21-1 side. The above response signals at write transfer time are transmitted along the write response channel. In FIG. 11, the response signals at write transfer time transmitted along the write response channel are indicated by WR-1, WR-2, WR-3, and WR-4.

The clock signal ACLK, a power control signal, and the like are supplied to the slave 22-1 at write transfer time. The signals AWREADY, WREADY, BVALID, and BRESP are outputted from the slave 22-1. FIG. 11 also indicates a state of each of a write address channel, a write data channel, and a write response channel on the slave 22-1 side.

The clock signal ACLK and a signal SEL are supplied to the response circuit unit 25b. In addition, the response signals, such as the signals AWREADY, WREADY, BVALID, and BRESP, are outputted from the response circuit unit 25b. The signal SEL supplied to the response circuit unit 25b is supplied from the switching circuit unit 25c and indicates whether or not the slave 22-1 is in a low power consumption state (non-selected state). FIG. 11 also indicates a state of a write response channel along which the response signals outputted from the response circuit unit 25b are transferred.

In FIG. 11, until timing t30 the power control signal is "0" and the slave 22-1 is in a non-low power consumption state. At this time the designation of the write addresses WA-1 and WA-2 and the transfer of the write data WD-1 are performed between the master 21-1 and the slave 22-1. When the slave 22-1 is in a non-low power consumption state, the signals BRESP outputted from the slave 22-1 and the response circuit unit 25b indicate the transfer status "OK".

Furthermore, in the example of FIG. 11, until the timing t30 the response circuit unit 25b outputs the signals AWREADY, WREADY, and BRESP which are the same as those outputted from the slave 22-1.

In the example of FIG. 11, the power control signal becomes "1" (at the timing t30) when the master 21-1 is in a wait state (signal BREADY is "0") before the completion of a handshake between the master 21-1 and the slave 22-1 by the response signal WR-1 transmitted along the write response channel. As a result, the slave 22-1 goes into a low power consumption state and cannot respond.

At this time the switching circuit unit 25c performs switching so as to transmit to the master 21-1 a signal outputted from the response circuit unit 25b. Furthermore, the switching circuit unit 25c sets the signal SEL to "1". When the signal SEL changes, the response circuit unit 25b determines from transfer information stored in the storage 25d of the analysis circuit unit 25a that transfer is being performed, set the signals AWREADY and WREADY to "0", and generates a wait. In addition, the master 21-1 detects at timing t31 the wait generated by the response circuit unit 25b.

When the signal BREADY is "0" and the master 21-1 and the slave 22-1 are in a state in which they are waiting for the completion of a handshake via the write response channel, a change in signal on the slave side is prohibited. Therefore, the response circuit unit 25b generates the signal BVALID "1" from the timing t30 to the detection of the signal BREADY of "1", maintains the response signal WR-1, and returns an OK response to the master 21-1. After that, at timing t31 the response circuit unit 25b changes the transfer status indicated by the signal BRESP to "SLVERR".

By the way, in the example of FIG. 11, the designation of the write address WA-2 ends. When the transfer of write data WD-2 along the write data channel begins at the timing t30, the slave 22-1 goes into a low power consumption state. At this time the response circuit unit 25b also generates a wait. In the example of FIG. 11, however, the response circuit unit 25b generates this wait at the same timing t30 at which the response circuit unit 25b generates the above wait.

When the transfer of the write data WD-2 along the write data channel is completed after the release of the wait (timing t34), the response circuit unit 25b generates a response signal WR-2, makes the signal BVALID "1" until the detection of the signal BREADY of "1", and makes a slave error response.

At timing t35 the master 21-1 detects the slave error response. As a result, the master 21-1 can detect that an error has occurred in the slave 22-1 and that write transfer cannot be performed.

Furthermore, in the example of FIG. 11, the slave 22-1 goes into a low power consumption state when the designation of a write address WA-3 is begun. At this time the response circuit unit 25b also generates a wait. In the example of FIG. 11, however, the response circuit unit 25b generates this wait at the same timing t30 at which the response circuit unit 25b generates the above waits.

The response circuit unit 25b completes the transfer of the write address WA-3 along the write address channel after the release of the wait (timing t32). After the master 21-1 transfers the write data WD-2 along the write data channel, the response circuit unit 25b completes the transfer of write data WD-3 (timing t36). At the timing t36 the response circuit unit 25b generates a response signal WR-3, makes the signal BVALID "1" until the detection of the signal BREADY of "1", and makes a slave error response.

At timing t37 the master 21-1 detects the slave error response. As a result, the master 21-1 can detect that an error has occurred in the slave 22-1.

Furthermore, in the example of FIG. 11, the transfer of a write address WA-4 along the write address channel is completed at timing t33 at which the slave 22-1 is in a low power consumption state.

At the timing t37 the power control signal becomes "0" and the low power consumption state of the slave 22-1 is released. However, transfer along the write address channel is not performed. That is to say, when the low power consumption state of the slave 22-1 is released, there is write transfer which is not yet completed. Therefore, the switching circuit unit 25c maintains a path so that transmission and receiving will be performed between the master 21-1 and the response circuit unit 25b. As a result, a signal (write data WD-4) is not transferred to the slave 22-1 along the write data channel.

The transfer of the write data WD-4 by the master 21-1 along the write data channel is completed (timing t38). However, the response signal WR-4 is not transmitted to the master 21-1 and the write transfer is not completed. Accordingly, the switching circuit unit 25c maintains a path so that the response signal WR-4 will be transmitted from the response circuit unit 25b to the master 21-1.

The response circuit unit 25b makes the signal BVALID "1" from the timing t38 to the detection of the signal BREADY of "1" and makes a slave error response. The master 21-1 detects the slave error response at timing t39 and can recognize that an error has occurred in the slave 22-1. In addition, at the timing t39 the response circuit unit 25b set a transfer status indicated by the signal BRESP to "OK".

All the write transfer has been completed, so at timing t40 the switching circuit unit 25c performs path switching so that signals will also be transmitted from the slave 22-1 to the master 21-1 along the write address channel, the write data channel, and the write response channel. An example of the operation at read transfer time of the semiconductor integrated circuit at AXI application time will now be described.

Figure 12:
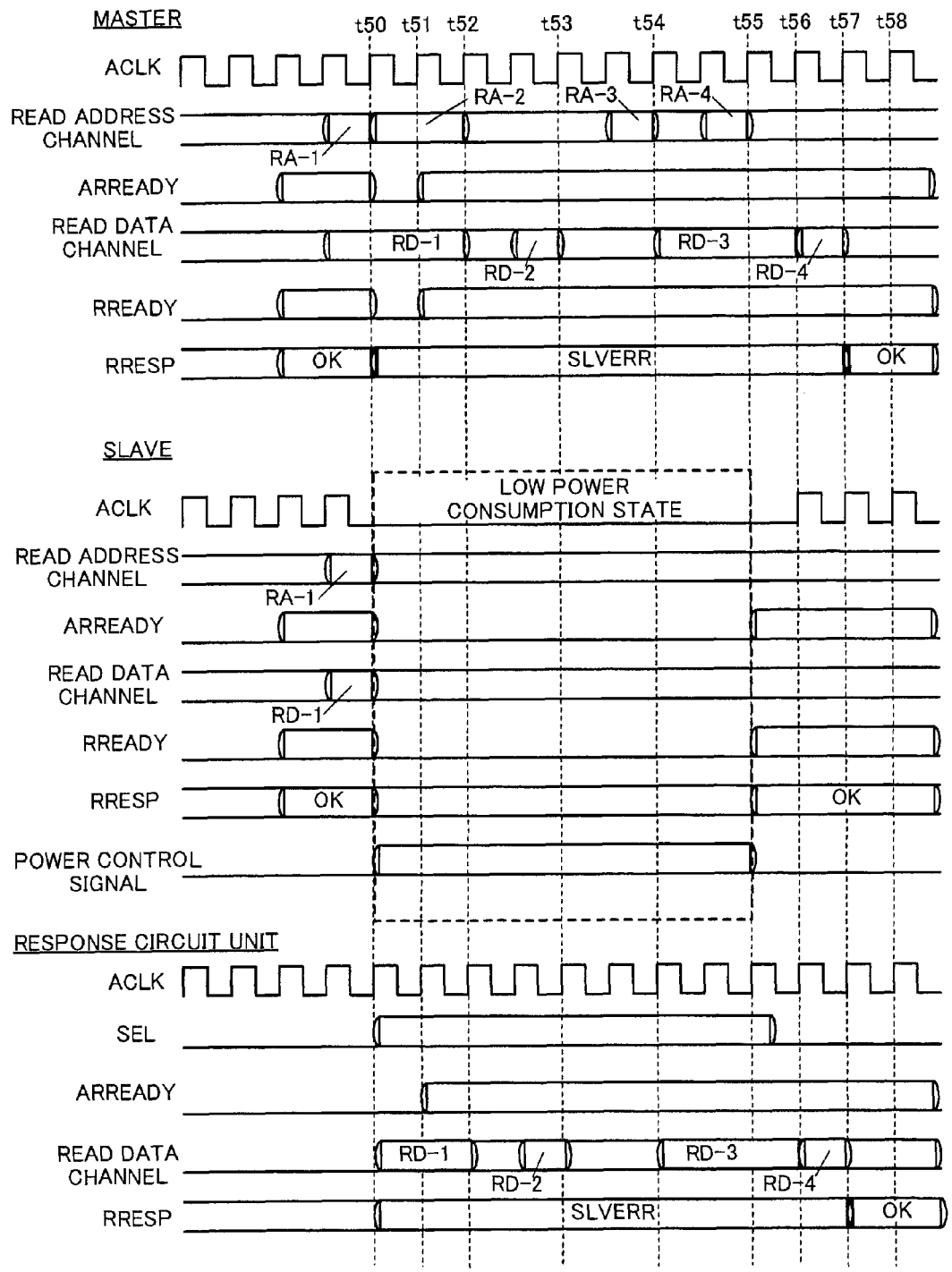
FIG. 12 is a timing chart of an example of the operation at read transfer time of the semiconductor integrated circuit at AXI application time.

FIG. 12 is a timing chart of an example of the operation at read transfer time of the semiconductor integrated circuit at AXI application time. FIG. 12 indicates a state of each signal in the master 21-1, the slave 22-1, and the response circuit unit 25b.

A clock signal ACLK and response signals at read transfer time, such as signals ARREADY and RRESP, transmitted from the slave 22-1 or the error response circuit 25-1 are supplied to the master 21-1 at read transfer time.

FIG. 12 also indicates a state of each of a read address channel and a read data channel on the master 21-1 side.

The clock signal ACLK, a power control signal, and the like are supplied to the slave 22-1 at read transfer time. The signals ARREADY, RRESP, and the like are outputted from the slave 22-1. In addition, a signal RVALID (not indicated) and the like are outputted from the slave 22-1. FIG. 12 also indicates a state of each of a read address channel and a read data channel on the slave 22-1 side.

The clock signal ACLK and a signal SEL are supplied to the response circuit unit 25b. In addition, the signals ARREADY, RRESP, and the like are outputted from the response circuit unit 25b. In addition, a signal RVALID (not indicated) and the like are outputted from the response circuit unit 25b. The signal SEL supplied to the response circuit unit 25b is supplied from the switching circuit unit 25c and indicates whether or not the slave 22-1 is in a low power consumption state (non-selected state).

In FIG. 12, until timing t50 the power control signal is "0" and the slave 22-1 is in a non-low power consumption state. At this time the designation of a read address RA-1 and the transfer of read data RD-1 are being performed between the slave 22-1 and the master 21-1 in a state in which the signal RVALID is set to "1" by the slave 22-1 and in which a transfer status indicated by the signal RRESP is set to "OK" by the slave 22-1.

In the example of FIG. 12, the power control signal becomes "1" during the transfer of the read data RD-1 (timing t50). As a result, the slave 22-1 goes into a low power consumption state and cannot respond.

At this time the switching circuit unit 25c performs path switching so as to transmit to the master 21-1 a signal outputted from the response circuit unit 25b instead of transmitting to the master 21-1 a signal outputted from the slave 22-1. Furthermore, the switching circuit unit 25c sets the signal SEL to an H level. When the signal SEL changes, the response circuit unit 25b determines from transfer information (such as the read address RA-1) stored in the storage 25d of the analysis circuit unit 25a that transfer is being performed, set the signal ARREADY to "0", and generates a wait. In addition, the response circuit unit 25b changes a transfer status indicated by the signal RRESP to "SLVERR". Furthermore, the response circuit unit 25b generates the read data RD-1 which is an arbitrary value.

In the example of FIG. 12, the signal ARREADY outputted from the response circuit unit 25b is "0" from before the timing t50.

The signal ARREADY of "1" outputted from the slave 22-1 is supplied to the master 21-1 before the timing t50. After the switching by the switching circuit unit 25c, however, the signal ARREADY of "0" outputted from the response circuit unit 25b is supplied to the master 21-1. As a result, at timing t51 the master 21-1 detects the wait generated by the response circuit unit 25b.

At the timing t51 the response circuit unit 25b sets the signal ARREADY to "1" and releases the wait. At timing t52 the master 21-1 detects the release of the wait. Furthermore, the master 21-1 detects a slave error response by the signal RRESP. As a result, the master 21-1 can detect that an error has occurred in the slave 22-1 and that read transfer cannot be performed.

By the way, in the example of FIG. 12, the slave 22-1 goes into a low power consumption state when the designation of a read address RA-2 is begun. At this time the response circuit unit 25b also generates a wait. In the example of FIG. 12, however, the response circuit unit 25b generates this wait at the same timing t50 at which the response circuit unit 25b generates the above wait.

After the release of the wait, the response circuit unit 25b completes the transfer of the read address RA-2 along the read address channel (timing t52). The response circuit unit 25b generates read data RD-2 which is an arbitrary value, and transfers it along the read data channel. However, the response circuit unit 25b makes a slave error response to this transfer. At timing t53 the master 21-1 detects an error in the slave 22-1.

Furthermore, in the example of FIG. 12, the transfer of a read address RA-3 along the read address channel is completed at timing t54 at which the slave 22-1 is in a low power consumption state.

At timing t55, the power control signal becomes "0" and the low power consumption state of the slave 22-1 is released. However, there is read transfer which is not yet completed, so the switching circuit unit 25c maintains a path so that read data RD-3 which is generated by the response circuit unit 25b and which is an arbitrary value will be transferred to the master 21-1.

At this time the response circuit unit 25b makes a slave error response to the transfer of the read data RD-3 which is an arbitrary value. At timing t56 the master 21-1 detects an error in the slave 22-1.

In addition, in the example of FIG. 12, the transfer of a read address RA-4 along the read address channel is completed at the timing t55 at which the slave 22-1 is in a low power consumption state.

Accordingly, after the transfer along the read data channel of the read data RD-3 which is an arbitrary value ends at the timing t56, the switching circuit unit 25c maintains a path so that read data RD-4 which is generated by the response circuit unit 25b and which is an arbitrary value will be transferred to the master 21-1.

At this time the response circuit unit 25b makes a slave error response to the transfer of the read data RD-4 which is an arbitrary value. At timing t57 the master 21-1 detects an error in the slave 22-1.

Furthermore, at the timing t57 the response circuit unit 25b changes a transfer status indicated by the signal RRESP to "OK".

All the read transfer has been completed, so at timing t58 the switching circuit unit 25c performs path switching so that signals will also be transmitted from the slave 22-1 to the master 21-1 along the read data channel.

Figure 13:
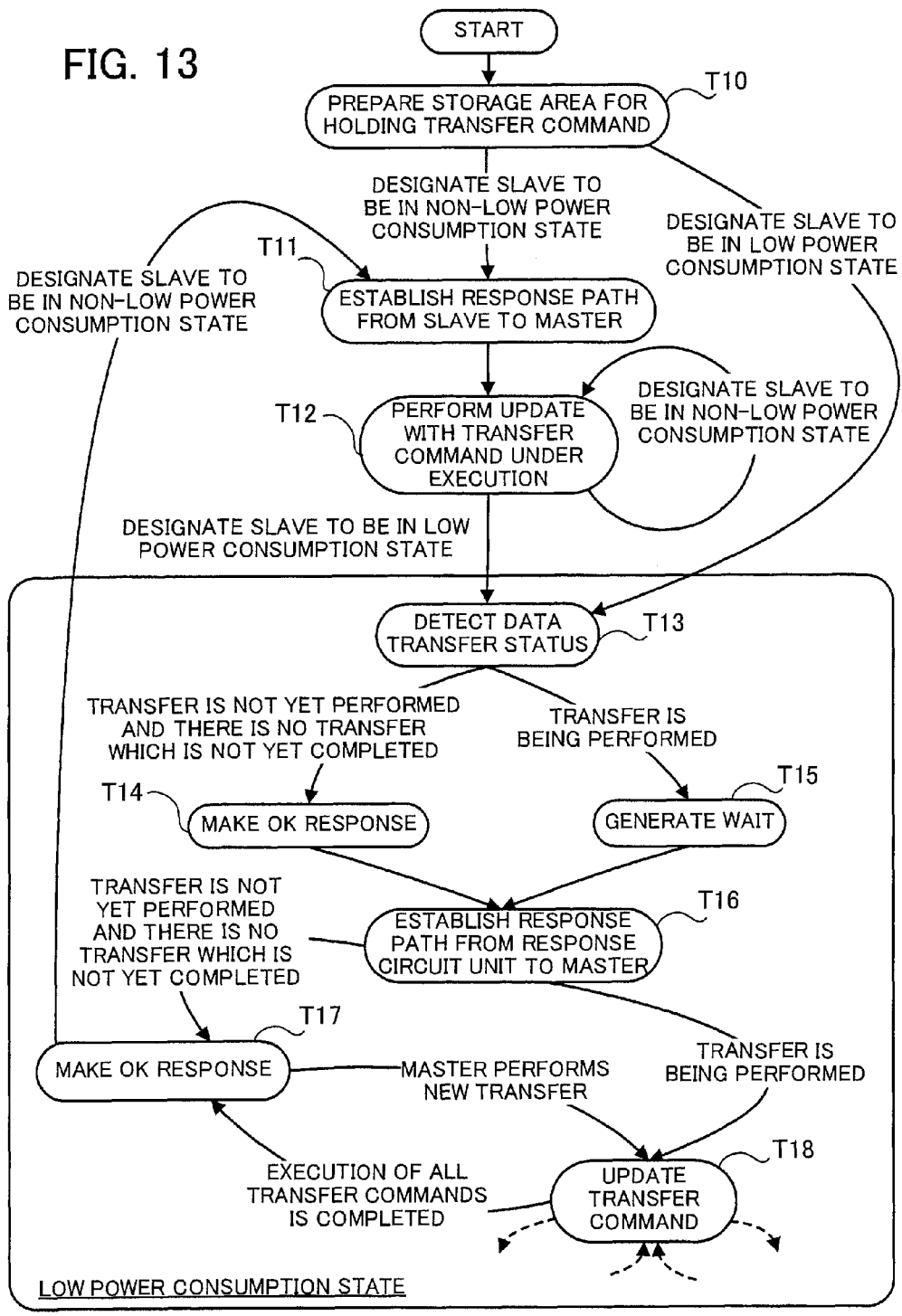
FIG. 13 is an example of the transition of a state of the semiconductor integrated circuit at AXI application time (part 1)
Figure 14:
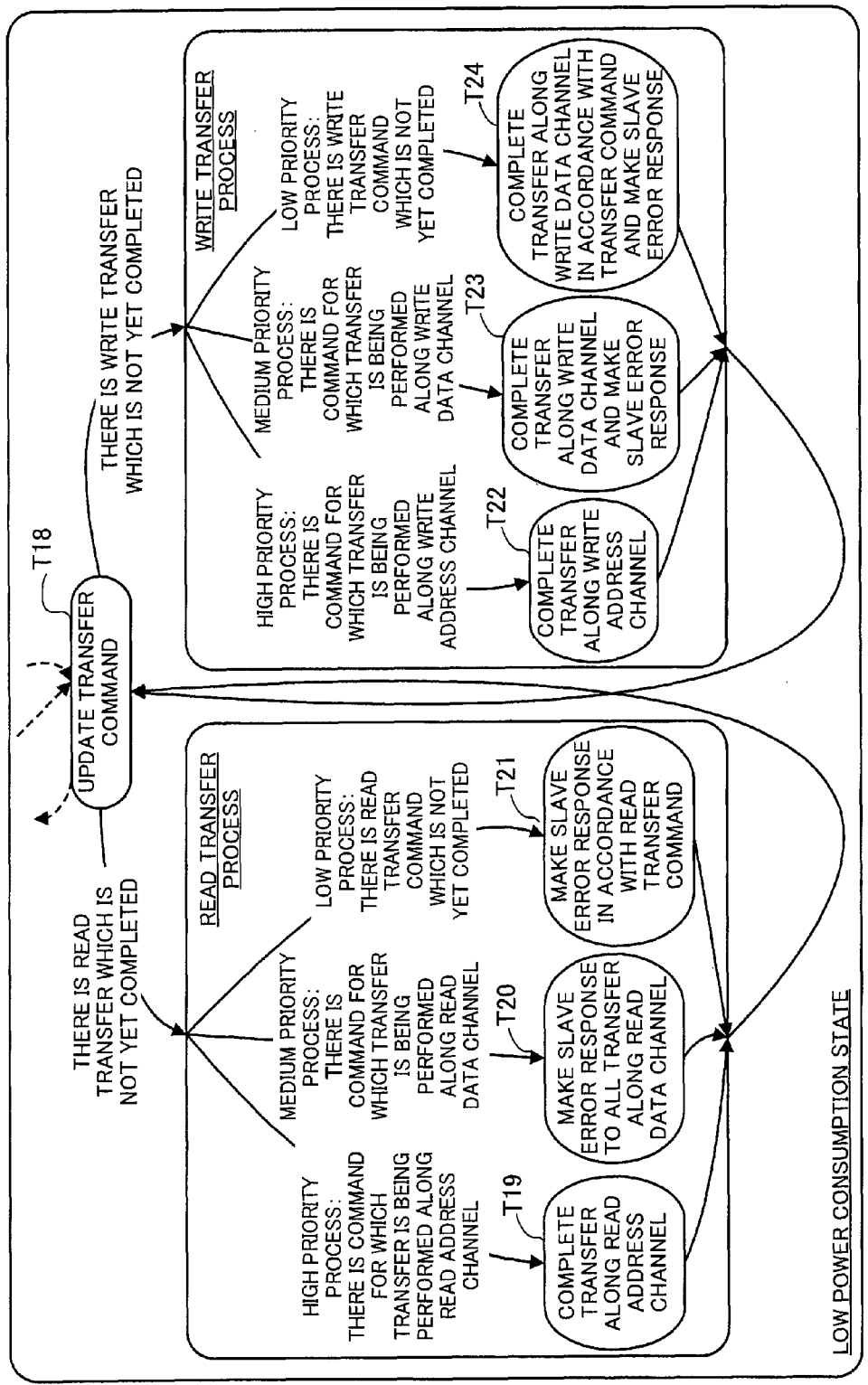
FIG. 14 is an example of the transition of a state of the semiconductor integrated circuit at AXI application time (part 2)

FIGS. 13 and 14 are an example of the transition of a state of the semiconductor integrated circuit at AXI application time.

First the error response circuit 25-1 prepares a storage area of the storage 25d for holding a transfer command (state T10). The storage area is prepared according to read issuing capability, read ID (Identification) capability, write issuing capability, and write ID capability.

The read issuing capability is the maximum number of read transactions which are being performed and which a master can issue. The read ID capability is the maximum number of different ARIDs (IDs of transactions via a read address channel) of read transactions which are being performed and which a master can issue.

The write issuing capability is the maximum number of write transactions which are being performed and which a master can issue. The write ID capability is the maximum number of different WRIDs (IDs of transactions via a write address channel) of write transactions which are being performed and which a master can issue.

If a power control signal designates the slave 22-1 at the time of the semiconductor integrated circuit being in a state T10 to be in a non-low power consumption state, then the semiconductor integrated circuit 20 changes to a state T11 in which path switching is performed so as to establish a response path from the slave 22-1 to the master 21-1. On the other hand, if the power control signal designates the slave 22-1 to be in a low power consumption state, then the semiconductor integrated circuit 20 changes to a state T13.

After being in the state T11, the semiconductor integrated circuit 20 goes into a state T12 in which the preceding transfer command stored in the storage 25d is updated with a write or read transfer command under execution. If the power control signal designates the slave 22-1 at the time of the semiconductor integrated circuit 20 being in the state T12 to be in a non-low power consumption state, then the state T12 is maintained. On the other hand, if the power control signal designates the slave 22-1 at the time of the semiconductor integrated circuit 20 being in the state T12 to be in a low power consumption state, then the semiconductor integrated circuit 20 makes a transition to a state T13.

When the semiconductor integrated circuit 20 is in the state T13, a state T14, a state T15, a state T16, a state T17, a state T18, a state T19, a state T20, a state T21, a state T22, a state T23, or a state T24, the slave 22-1 is in a low power consumption state. When the semiconductor integrated circuit 20 is in the state T13, the analysis circuit unit 25a of the error response circuit 25-1 analyzes the transfer command after the update in the storage 25d and detects a data transfer status. If transfer is not yet performed and there is no transfer which is based on a transfer command stored in the storage 25d or which is not yet completed, then the semiconductor integrated circuit 20 makes a transition to the state T14 in which the response circuit unit 25b makes an OK response.

As indicated in FIG. 13, at write transfer time the response circuit unit 25b makes an OK response by outputting the signal AWREADY of "1", the signal WREADY of "1", and the signal BRESP indicative of the transfer status "OK". Furthermore, as indicated in FIG. 14, at read transfer time the response circuit unit 25b makes an OK response by outputting the signal ARREADY of "1" and the signal RRESP indicative of the transfer status "OK".

On the other hand, if transfer is being performed at the time of the semiconductor integrated circuit 20 being in the state T13, then the semiconductor integrated circuit 20 makes a transition to the state T15 in which the response circuit unit 25b generates a wait.

When the semiconductor integrated circuit 20 is in the state T16 indicated after the state T14 or T15, the switching circuit unit 25c performs path switching so as to establish a response path from the response circuit unit 25b to the master 21-1. The state T16 arises at the same timing at which the state T14 or T15 arises.

After being in the state T16, the semiconductor integrated circuit 20 makes a transition to the state T17 in which the response circuit unit 25b makes an OK response, in the case of transfer not yet being performed and there being no transfer which is based on a transfer command stored in the storage 25d or which is not yet completed. On the other hand, after being in the state T16, the semiconductor integrated circuit 20 goes into the state T18 in which the preceding transfer command stored in the storage 25d is updated with a write or read transfer command under execution, in the case of transfer being under performance. In addition, if the master 21-1 performs new transfer at the time of the semiconductor integrated circuit 20 being in the state T17, then the semiconductor integrated circuit 20 makes a transition to the state T18. If the execution of all transfer commands stored in the storage 25d is completed at the time of the semiconductor integrated circuit 20 being in the state T18, then the semiconductor integrated circuit 20 makes a transition to the state T17.

As indicated in FIG. 14, on the other hand, if there is read transfer, at the time of the semiconductor integrated circuit 20 being in the state T18, which is not yet completed, then the semiconductor integrated circuit 20 goes into one of the states T19, T20, and T21 in which a read transfer process is performed. In addition, if there is write transfer, at the time of the semiconductor integrated circuit 20 being in the state T18, which is not yet completed, then the semiconductor integrated circuit 20 goes into one of the states T22, T23, and T24 in which a write transfer process is performed. A read transfer process and a write transfer process are performed in parallel.

As indicated in FIG. 14, for example, there are three priority levels (high priority process, medium priority process, and low priority process) for a read transfer process or a write transfer process.

With a read transfer process a state of the semiconductor integrated circuit 20 is as follows. If there is a command for which transfer is being performed along a read address channel, then the semiconductor integrated circuit 20 makes a transition to the state T19 in which it preferentially completes the transfer along the read address channel. If there is no command for which transfer is being performed along the read address channel and if there is a command for which transfer is being performed along a read data channel, then the semiconductor integrated circuit 20 makes a transition to the state T20 in which it makes an error response to all transfer along the read data channel. If there is no command for which transfer is being performed along the read address channel, if there is no command for which transfer is being performed along the read data channel, and if there is a read transfer command which is not yet completed, then the semiconductor integrated circuit 20 makes a transition to the state T21 in which it makes a slave error response in accordance with the read transfer command.

With a write transfer process a state of the semiconductor integrated circuit 20 is as follows. If there is a command for which transfer is being performed along a write address channel, then the semiconductor integrated circuit 20 makes a transition to the state T22 in which it preferentially completes the transfer along the write address channel. If there is no command for which transfer is being performed along the write address channel and if there is a command for which transfer is being performed along a write data channel, then the semiconductor integrated circuit 20 makes a transition to the state T23 in which it completes the transfer along the write data channel and in which it makes an error response to the transfer. If there is no command for which transfer is being performed along the write address channel, if there is no command for which transfer is being performed along the write data channel, and if there is a write transfer command which is not yet completed, then the semiconductor integrated circuit 20 makes a transition to the state T24 in which it completes transfer via the write data channel in accordance with the write transfer command and in which it makes a slave error response.

After being in the state T19, T20, or T21 and T22, T23, or T24, the semiconductor integrated circuit 20 makes a transition to the state T18.

The above control is exercised. As a result, even if AXI is applied, the semiconductor integrated circuit 20 according to the second embodiment can achieve the same effect that is obtained at AHB application time, and perform transfer in accordance with the AXI standard.

As has been described, the semiconductor integrated circuit 20 according to the second embodiment includes the error response circuits 25-1 through 25-n. However, the semiconductor integrated circuit 20 according to the second embodiment can perform transfer operation in accordance with each standard, so there is no need to change the masters 21-1 through 21-m and the slaves 22-1 through 21-n.

(Modification)

the above description data transfer is performed between the masters 21-1 through 21-m and the slaves 22-1 through 21-n illustrated in FIG. 2. However, each of the slaves 22-1 through 21-n may be the following circuit section.

Figure 15:
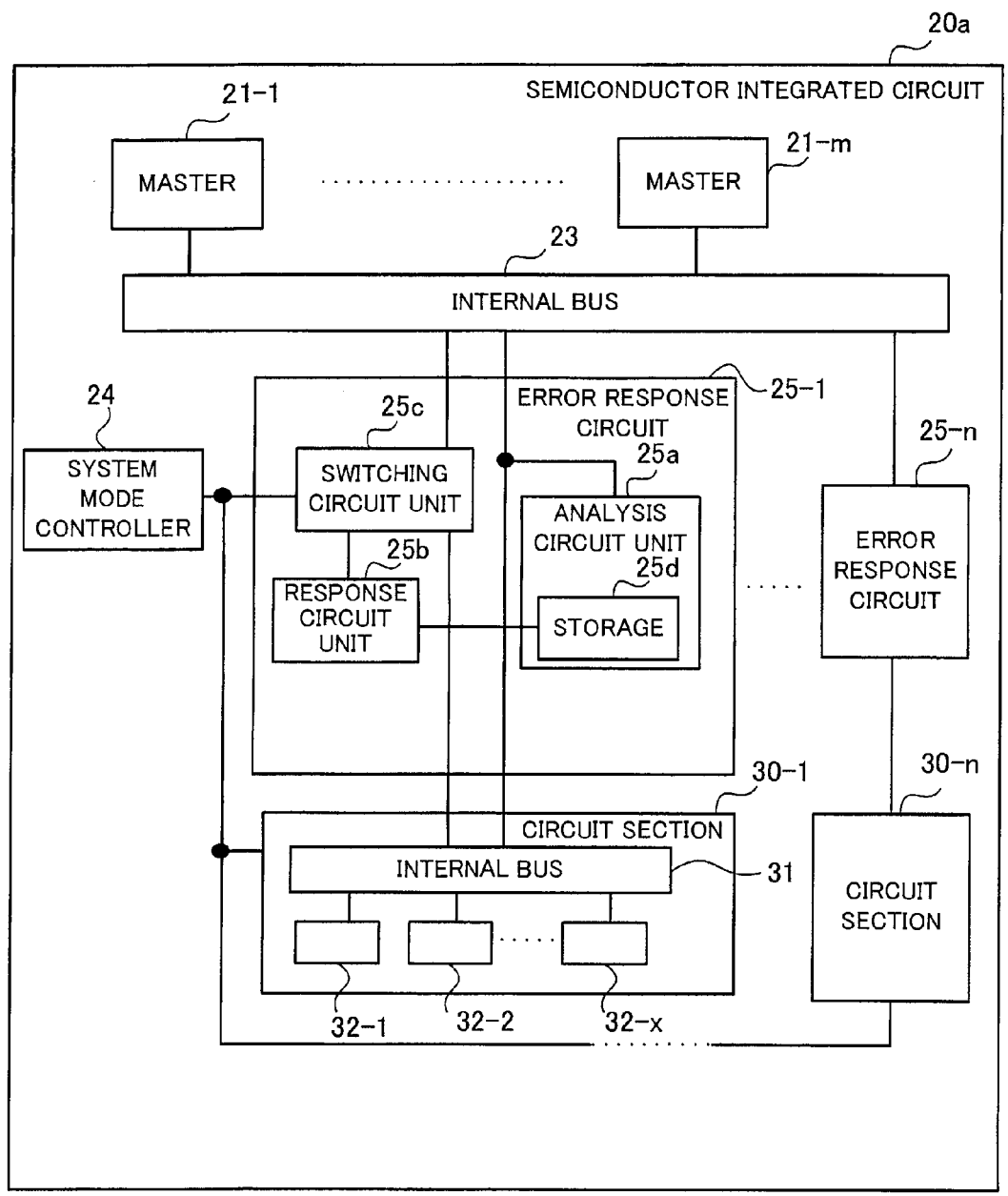
FIG. 15 illustrates a modification of the semiconductor integrated circuit according to the second embodiment.

FIG. 15 illustrates a modification of the semiconductor integrated circuit according to the second embodiment. Components in FIG. 15 which are the same as those illustrated in FIG. 2 are marked with the same numerals.

A semiconductor integrated circuit 20a illustrated in FIG. 15 includes circuit sections 30-1 through 30-n. Each of the circuit sections 30-1 through 30-n includes an internal bus 31 and modules 32-1, 32-2, . . . , and 32-x connected to the internal bus 31. A power control signal is supplied from a system mode controller 24 to the circuit sections 30-1 through 30-n. The number of the modules 32-1 through 32-x may differ among the circuit sections 30-1 through 30-n.

In the example of FIG. 15, the transfer of data is performed between masters 21-1 through 21-m and the modules 32-1 through 32-x included in the circuit sections 30-1 through 30-n. Error response circuits 25-1 through 25-n included correspond to the circuit sections 30-1 through 30-n respectively. The error response circuits 25-1 through 25-n exercise over the transfer of data between the masters 21-1 through 21-m and the circuit sections 30-1 through 30-n control which is the same as that described above.

For example, when the circuit section 30-1 goes into a low power consumption state during the transfer of data between the master 21-1 and the module 32-1 included in the circuit section 30-1, the error response circuit 25-1 transmits an error signal to the master 21-1 in place of the module 32-1 which cannot return a response. In addition, when the transfer of data between the master 21-1 and the module 32-1 included in the circuit section 30-1 is begun at the time of the circuit section 30-1 being in a low power consumption state, the error response circuit 25-1 transmits an error signal to the master 21-1 in place of the module 32-1 which cannot return a response.

According to the disclosed error response circuit, semiconductor integrated circuit, and data transfer control method, a hang-up can be prevented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An error response circuit comprising:
   an analysis circuit unit configured to analyze a command transmitted from a first circuit section to a second circuit section and to detect a status which indicated whether data transfer between the first circuit section and the second circuit section is being performed or not;
   a response circuit unit configured to generate an error signal in response to the second circuit section changing from a first power consumption state to a second power consumption state in which power consumption is lower than power consumption in the first power consumption state when the status, detected by the analysis circuit unit, indicated that the data transfer is being performed; and
   a switching circuit unit configured to transmit to the first circuit section the error signal generated by the response circuit unit in place of a response signal when the second circuit section is in the second power consumption state, the response signal being responsive to the command and transmitted from the second circuit section to the first circuit section.

2. The error response circuit according to claim 1, wherein when the second circuit section is in the second power consumption state and the first circuit section begins data transfer, the response circuit unit generates the error signal.

3. The error response circuit according to claim 1, wherein when the second circuit section returns from the second power consumption state to the first power consumption state, the switching circuit unit transmits the error signal generated by the response circuit unit to the first circuit section in accordance with the status at the time of the second circuit section being in the second power consumption state, and thereafter performs switching so that the response signal generated by the second circuit section is transmitted to the first circuit section.

4. The error response circuit according to claim 1, wherein when the second circuit section changes into the second power consumption state during data transfer between the first circuit section and the second circuit section, the response circuit unit generates a wait for temporarily deferring the data transfer, and thereafter generates the error signal.

5. A semiconductor integrated circuit comprising:
a first circuit section configured to be a source of a command;
a second circuit section configured to be a destination of the command and to return to the first circuit section a response signal responsive to the command; and
an error response circuit configured to analyze the command and to detect a status which indicated whether data transfer between the first circuit section and the second circuit section is being performed or not, the error response circuit configured to generate an error signal in response to the second circuit section changing from a first power consumption state to a second power consumption state in which power consumption is lower than power consumption in the first power consumption state when the status indicated that the data transfer is being performed and to transmit the error signal to the first circuit section in place of the response signal.

6. The semiconductor integrated circuit according to claim 5, wherein when the second circuit section is in the second power consumption state and the first circuit section begins data transfer, the error response circuit generates the error signal.

7. The semiconductor integrated circuit according to claim 5, wherein when the second circuit section returns from the second power consumption state to the first power consumption state, the error response circuit transmits the generated error signal to the first circuit section in accordance with the status transfer at the time of the second circuit section being in the second power consumption state, and thereafter performs switching so that the response signal generated by the second circuit section is transmitted to the first circuit section.

8. The semiconductor integrated circuit according to claim 5, wherein when the second circuit section changes into the second power consumption state during data transfer between the first circuit section and the second circuit section, the error response circuit generates a wait for temporarily deferring the data transfer, and thereafter generates the error signal.

9. A data transfer control method comprising:
analyzing a command transmitted from a first circuit section to a second circuit section and detecting a status which indicates whether data transfer between the first circuit section and the second circuit section is being performed or not;
generating an error signal in response to the second circuit section changing from a first power consumption state to a second power consumption state in which power consumption is lower than power consumption in the first power consumption state when the status indicates that the data transfer is being performed; and
transmitting the error signal to the first circuit section in place of a response signal, the response signal being responsive to the command and transmitted from the second circuit section to the first circuit section.

10. The data transfer control method according to claim 9, wherein when the second circuit section is in the second power consumption state and the first circuit section begins data transfer, the error signal is generated.

11. The data transfer control method according to claim 9, further comprising, when the second circuit section returns from the second power consumption state to the first power consumption state, transmitting the generated error signal to the first circuit section in accordance with the status at the time of the second circuit section being in the second power consumption state, and thereafter performing switching so that the response signal generated by the second circuit section is transmitted to the first circuit section.

12. The data transfer control method according to claim 9, wherein, when the second circuit section changes into the second power consumption state during data transfer between the first circuit section and the second circuit section, a wait for temporarily deferring the data transfer is generated, and thereafter the error signal is generated.

* * * * *